United States Patent
Fujisawa

(10) Patent No.: US 7,701,390 B2
(45) Date of Patent: Apr. 20, 2010

(54) TIME ADJUSTMENT DEVICE, TIMEKEEPING DEVICE WITH A TIME ADJUSTMENT DEVICE, AND A TIME ADJUSTMENT METHOD

(75) Inventor: Teruhiko Fujisawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 70 days.

(21) Appl. No.: 12/128,472

(22) Filed: May 28, 2008

(65) Prior Publication Data
US 2009/0015470 A1    Jan. 15, 2009

(30) Foreign Application Priority Data
Jul. 9, 2007    (JP)    ............................. 2007-179926
Feb. 20, 2008    (JP)    ............................. 2008-038370

(51) Int. Cl.
G01S 19/26    (2006.01)
G04B 47/00    (2006.01)

(52) U.S. Cl. .................................... 342/357.13; 368/10
(58) Field of Classification Search ....................... None
See application file for complete search history.

(56) References Cited

U.S. PATENT DOCUMENTS

| | | | | |
|---|---|---|---|---|
| 5,629,708 A | * | 5/1997 | Rodal et al. | 342/357.15 |
| 5,940,027 A | * | 8/1999 | Forseth et al. | 342/357.06 |
| 6,212,133 B1 | * | 4/2001 | McCoy et al. | 368/9 |
| 6,445,341 B2 | * | 9/2002 | Hasegawa | 342/357.13 |
| 2007/0241959 A1 | * | 10/2007 | Nakagawa | 342/357.06 |
| 2008/0074950 A1 | * | 3/2008 | Rostrom | 368/10 |

FOREIGN PATENT DOCUMENTS

| | | |
|---|---|---|
| JP | 10082875 | 3/1998 |
| JP | 11125666 | 5/1999 |
| JP | 11211858 | 8/1999 |
| JP | 2000-199792 | 7/2000 |
| WO | 01/75470 A1 | 10/2001 |

* cited by examiner

Primary Examiner—Gregory C Issing

(57) ABSTRACT

A time adjustment device having a reception unit that receives a satellite signal transmitted from a positioning information satellite; a time information generating unit that generates time information; a generated time information storage unit that stores the time information generated by the time information generating unit as generated time information; and a starting information generating unit that generates information before the beginning of a specific unit of the satellite signal that is transmitted in specific units from the positioning information satellite as before-starting information based on the generated time information. The reception unit has a starting unit that starts searching for the positioning information satellite at a predetermined timing based on the before-starting information, and a stopping unit that detects the specific unit of the satellite signal and stops searching for the positioning information satellite. The generated time information is corrected at the timing when the reception unit stops.

9 Claims, 18 Drawing Sheets

US 7,701,390 B2

TIME ADJUSTMENT DEVICE, TIMEKEEPING DEVICE WITH A TIME ADJUSTMENT DEVICE, AND A TIME ADJUSTMENT METHOD

CROSS-REFERENCE TO RELATED APPLICATIONS

Japanese Patent applications No.(s) 2007-179926 and 2008-038370 are hereby incorporated by reference in their entirety.

FIELD OF INVENTION

The present invention relates to a time adjustment device that corrects the time based on signals from a positioning information satellite such as a GPS satellite, to a timekeeping device that has the time adjustment device, and to a time adjustment method.

DESCRIPTION OF RELATED ART

The Global Positioning System (GPS) for determining the position of a GPS receiver uses GPS satellites that circle the Earth on a known orbit, and each GPS satellite has an atomic clock on board. Each GPS satellite therefore keeps the time (referred to below as the GPS time) with extremely high precision.

Japanese Unexamined Patent Appl. Pub. JP-A-H11-211858 (paragraphs [0002] and [0003]) teaches a radio-controlled timepiece that is similar to a GPS device that uses GPS satellites but that analyzes the time code contained in a long-wave standard time signal to correct the displayed time instead of using GPS satellite signals or a method of correcting the time based on GPS time information.

The time information transmitted in a GPS satellite signal is updated on a predetermined cycle. Japanese Unexamined Patent Appl. Pub. JP-A-H11-125666 teaches technology for predicting the GPS time information after being updated at this predetermined period, predicting the time of the next GPS time signal, and using this predicted time to acquire the positioning information for the device location. Measuring the pseudo range to the GPS satellite and determining the current position is therefore possible even when the reception environment is not ideal.

Japanese Unexamined Patent Appl. Pub. JP-A-H10-82875 teaches a method of correcting the time using the time information (GPS time) from a GPS satellite.

This method acquires the navigation message at full power (that is, with the CPU running and other parts operating) immediately after the power is turned on. The time information contained in the acquired navigation message is then acquired and the time is calculated. The time is then calculated and the timing for the next correction is determined from the relationship between the precision of the crystal that generates the reference clock signal of the GPS device and the required precision of the timepiece. More specifically, the time when the next navigation message will be acquired (when the CPU is stopped and a sleep mode is active) is determined. The navigation message is then acquired again after the sleep mode ends, and the time is corrected based on the time information acquired from the navigation message.

With this method, however, power consumption rises because more time is required to acquire the navigation message after waking from the sleep mode or just after the power turns on. Acquiring the navigation message is also unsuitable when reducing power consumption is desirable. In addition, the next time for correcting the time information is calculated from the relationship between the precision of the crystal that generates the reference clock signal of the GPS device and the required precision of the timepiece. The timing when the time is corrected must therefore be adjusted in each individual device.

SUMMARY OF INVENTION

A time adjustment device, a timekeeping device with the time adjustment device, and a time adjustment method according to preferred aspects of the present invention receive time data efficiently in a short time and enable correcting the time without greatly increasing the power consumption.

A time adjustment device according to a first aspect of the invention includes a reception unit that receives a satellite signal transmitted from a positioning information satellite, a time information generating unit that generates time information, a generated time information storage unit that stores the time information generated by the time information generating unit as generated time information, and a starting information generating unit that generates information before the beginning of a specific unit of the satellite signal that is transmitted in specific units from the positioning information satellite as before-starting information based on the generated time information. The reception unit has a starting unit that starts searching for the positioning information satellite at a predetermined timing based on the before-starting information, and a stopping unit that detects the specific unit of the satellite signal and stops searching for the positioning information satellite. The generated time information is corrected at the timing when the reception unit stops.

In this aspect of the invention the reception unit searches for a positioning information satellite from a predetermined time before the beginning of a specific unit of the satellite signal until the signal starts, and has a stopping unit that detects the specific unit of the satellite signal and stops reception. The generated time information is adjusted to the time when the reception unit stops. As a result, the time adjustment device can correct the time with a shorter signal reception time.

In the time adjustment device according to another aspect of the invention the specific unit of the satellite signal includes satellite time information that is time information from the positioning information satellite, and the reception unit includes a decision unit that acquires the satellite time information and determines if the satellite time information is correct. This time adjustment device additionally has a satellite time information storage unit that stores the satellite time information determined by the decision unit to be correct as correct satellite time information; and a time adjustment unit that produces corrected display time information by correcting the generated time information based on the correct satellite time information.

With this aspect of the invention the reception unit gets the satellite time information from the positioning information satellite, that is, the Z count, and has an evaluation unit that determines if the acquired satellite time information is correct. If the evaluation unit determines the information is correct, the time information of the time display unit is corrected based on that satellite time information.

As a result, the time adjustment device can correct the time at a predetermined timing independently of the device performance, and can reliably set the correct time because the time is adjusted based on satellite time information that was determined to be correct.

Further preferably, the time adjustment device according to another aspect of the invention additionally has a threshold value offset evaluation unit that determines if the difference, which is the current time adjustment amount, between the generated time information and the satellite time information is outside the range of a threshold value offset, which is a time offset corresponding to the time passed since the generated time information when the time was last adjusted. The time adjustment unit does not adjust the generated time information based on the current satellite time information if the threshold value offset evaluation unit determines that said difference is outside the threshold value offset range.

This aspect of the invention has a threshold value offset evaluation unit that determines if the current time adjustment amount of the time adjustment unit exceeds the range of the threshold value offset, which is the time offset corresponding to the time passed since the generated time information when the time was last adjusted. If this threshold value offset evaluation unit determines that the current time adjustment exceeds this threshold value offset range, the time adjustment unit does not correct the time information using the current satellite time information.

As a result, the time will not be changed based on the satellite time information when the current satellite time information is determined unreliable, and the offset will therefore not become even greater.

Yet further preferably, in the time adjustment device according to another aspect of the invention the specific unit of the satellite signal is a frame information unit wherein five subframe information units containing at least the satellite time information constitute one unit, and the reception unit receives the satellite time information in the first subframe information unit.

Because the satellite time information acquired by the reception unit is the satellite time information acquired from the first subframe information unit of the satellite signal, the time can be adjusted reliably at a predetermined time.

In a time adjustment device according to another aspect of the invention, the before-starting information generated by the starting information generating unit is rendered so that the generated time information is corrected at the 0 second or the 30 second.

With this aspect of the invention the before-starting information generated by the starting information generating unit causes the generated time information to be corrected at either second 0 or 30 of the minute. User convenience is thus improved because the time is corrected at either second 0 or 30 of the minute when the time adjustment device adjusts the time.

Yet further preferably in a time adjustment device according to another aspect of the invention, the first subframe information unit contains positioning information satellite health information denoting the condition of the positioning information satellite, and the reception unit acquires the positioning information satellite health information when a specific time has passed since the last time the generated time information was corrected. The time adjustment device additionally has a health evaluation unit that determines the condition of the positioning information satellite based on the positioning information satellite health information.

With this aspect of the invention the reception unit the reception unit acquires the positioning information satellite health information describing the condition of the positioning information satellite when a specific time has passed since the last time the generated time information was corrected. The time adjustment device additionally has a health evaluation unit that determines the health of the positioning information satellite, that is, whether the satellite is functioning normally and whether or not there is a problem with the satellite itself.

Positioning information satellite health information describing the condition of the positioning information satellite is therefore acquired when a specific time has passed since the last time the generated time information was corrected. As a result, if the condition of the positioning information satellite has changed since the last time the satellite signal was received, the time can be adjusted based on the condition of the satellite. If a problem with the positioning information satellite is detected, the satellite time information from that positioning information satellite is not used to adjust the time. As a result, the time adjustment device will not correct the time based on unreliable satellite time information.

In a time adjustment device according to another aspect of the invention, when the health evaluation unit determines that the positioning information satellite is operating normally based on the positioning information satellite health information, the reception unit additionally acquires the satellite time information in the next subframe information unit of the satellite signal if the threshold value offset evaluation unit determines the threshold value offset range is exceeded. This time adjustment device also has a satellite time information storage unit that stores the satellite time information from the subframe information units as satellite time information data. The time adjustment unit is an arrangement that adjusts the generated time information using the satellite time information data from one of at least two subframe information units of which the satellite time information data is within the offset between the subframe information units of the satellite signal.

When the health evaluation unit determines that the positioning information satellite is operating normally, that is, the health evaluation unit determines that there is not a problem with the positioning information satellite, and the threshold value offset range is exceeded, it is known that there is a problem with the satellite time information in the first subframe information unit. The reception unit therefore gets the satellite time information from the next subframe information unit. The satellite time information acquired from each of the subframe information units is compared, and if a match is confirmed between at least two of the satellite times, that satellite time information is used to adjust the internal clock. The time adjustment device can therefore reliably correct the time with high precision.

Yet further preferably, in the time adjustment device according to another aspect of the invention, the reception unit receives signals from another positioning information satellite when the health evaluation unit determines the positioning information satellite is not healthy based on the positioning information satellite health information.

When it is determined that the positioning information satellite health information for the positioning information satellite is not normal, that is, when it is determined that there is a problem with the satellite, a different positioning information satellite is located for signal reception. The time can therefore be corrected using the satellite time information of the satellite signal from a positioning information satellite that is operating normally. The time adjustment device can therefore reliably correct the time with high precision.

In the time adjustment device according to another aspect of the invention the first subframe information unit includes week number information, which is the number of weeks since the origin of the satellite time information. Calendar information is contained in the internal time counter of the time information generating unit that generates the time information of the time adjustment device, the reception unit acquires the week number information when the calendar information changes, and the calendar information is adjusted based on the week number information.

With this aspect of the invention the reception unit gets the week number information contained in the first subframe information unit of the satellite signal from the positioning information satellite. If the calendar information stored in the time adjustment device has been changed or reset by some action of the user, this enables the time adjustment device to correct the calendar information based on the acquired week number value, and this is convenient for the user.

Another aspect of the invention is a timekeeping device with a time adjustment device having a reception unit that receives a satellite signal transmitted from a positioning information satellite; a time information generating unit that generates time information; a generated time information storage unit that stores the time information generated by the time information generating unit as generated time information; and a starting information generating unit that generates information before the beginning of a specific unit of the satellite signal that is transmitted in specific units from the positioning information satellite as before-starting information based on the generated time information. The reception unit has a starting unit that starts searching for the positioning information satellite at a predetermined timing based on the before-starting information, and a stopping unit that detects the specific unit of the satellite signal and stops searching for the positioning information satellite. The generated time information is corrected at the timing when the reception unit stops.

Another aspect of the invention is a time adjustment method including a time information generating step of generating time information; a generated time information storage step of storing the time information generated by the time information generating step as generated time information; a starting information generating step of generating information before the beginning of a specific unit of the satellite signal that is transmitted in specific units from a positioning information satellite as before-starting information based on the generated time information; a reception step including a starting step that starts searching for a positioning information satellite at a predetermined timing based on the before-starting information, and a stopping step that detects the specific unit of the satellite signal and stops searching for the positioning information satellite; and a step of correcting the generated time information at the timing when the stopping step of the reception step stops reception.

DESCRIPTION OF THE PREFERRED EMBODIMENTS

Preferred embodiments of the present invention are described below with reference to the accompanying figures.

The embodiments described below are specific preferred embodiments of the present invention are certainly technically preferred limitations are therefore also described, but the scope of the present invention is not limited to these embodiments or limitations unless specifically stated below.

Embodiment 1

Figure 1:
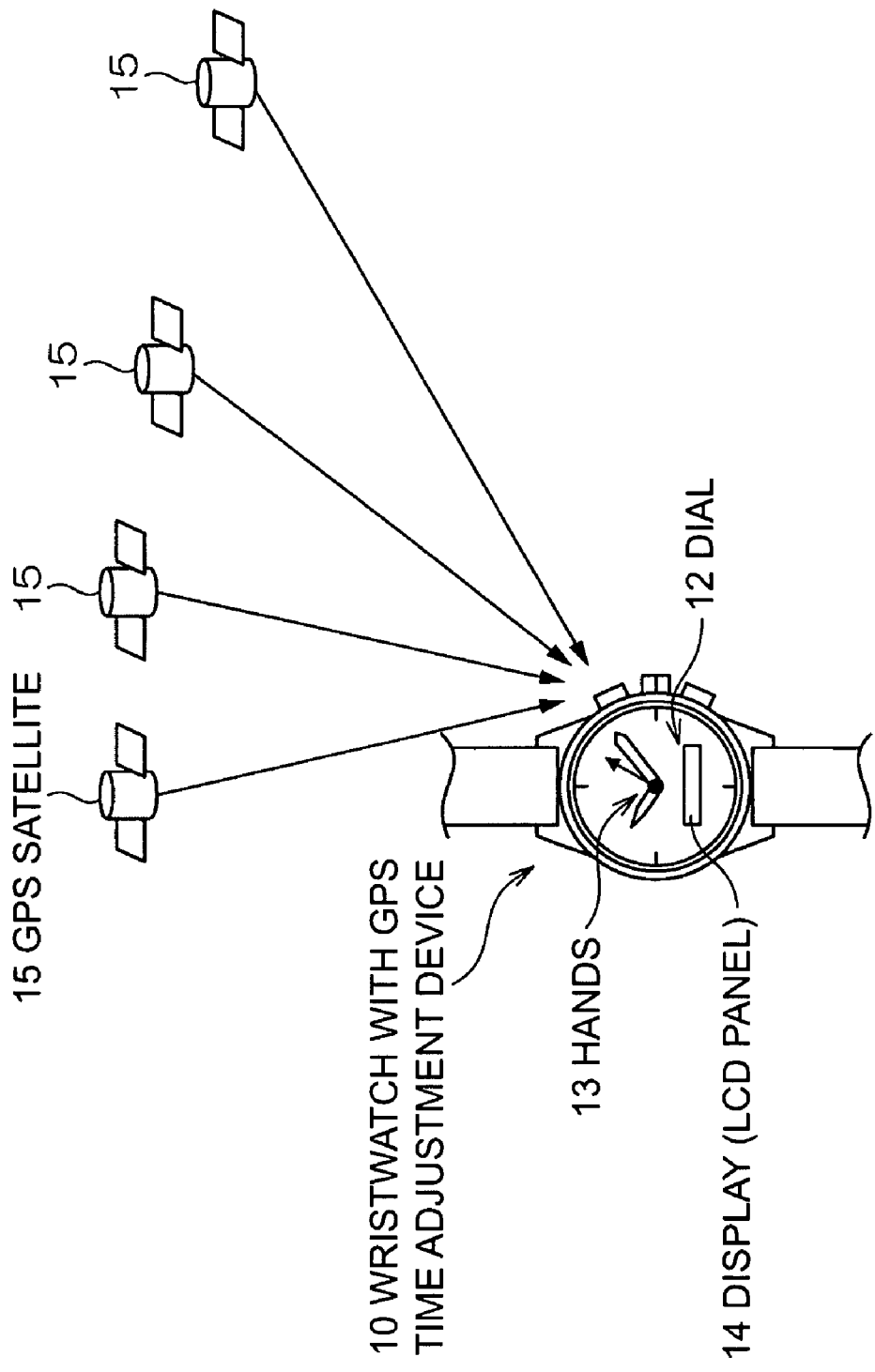
FIG. 1 is a schematic diagram showing a wristwatch with a GPS time adjustment device.
Figure 2:
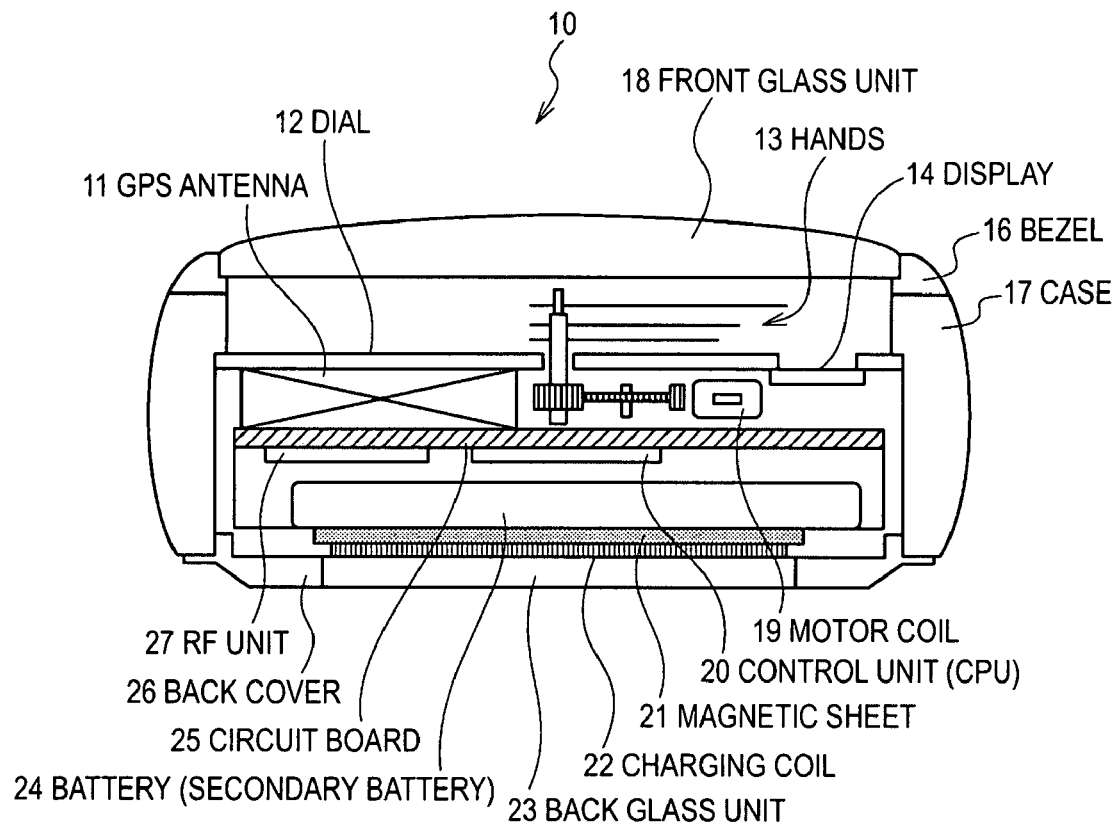
FIG. 2 is a side section view of the wristwatch with a GPS time adjustment device shown in FIG. 1.
Figure 3:
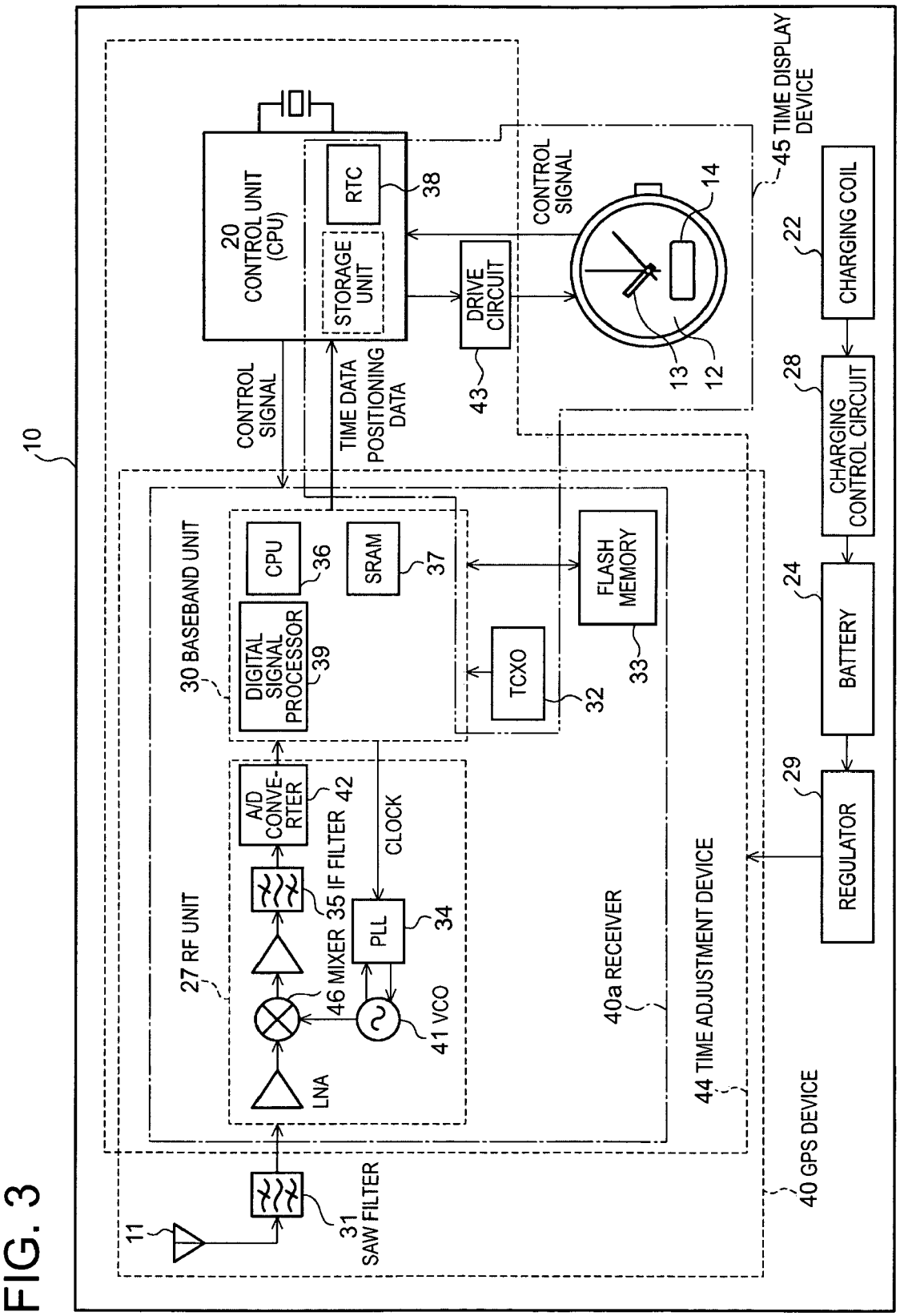
FIG. 3 is a block diagram showing the main internal hardware configuration of the wristwatch with a GPS time adjustment device shown in FIG. 1 and FIG. 2.

FIG. 1 is a schematic diagram showing a wristwatch with a GPS time adjustment device 10 (referred to below as a GPS wristwatch 10) as an example of a timekeeping device with a time adjustment device according to the present invention. FIG. 2 is a side section view of the GPS wristwatch 10 shown in FIG. 1. FIG. 3 is a block diagram showing the main internal hardware configuration of the GPS wristwatch 10 shown in FIG. 1 and FIG. 2.

As shown in FIG. 1 and FIG. 2, the GPS wristwatch 10 has a time display unit and a display 14 on the front. The time display unit includes a dial 12 and hands 13 such as the second hand, minute hand, and hour hand. The display 14 in this aspect of the invention is an LCD panel used for presenting location information such as the latitude and longitude or the city name, as well as other informational messages. The hands 13 are driven through a wheel train by means of a stepping motor that includes a motor coil 19.

As shown in FIG. 2, the GPS wristwatch 10 has a GPS antenna 11. The GPS antenna 11 is a part of the GPS device 40 (see FIG. 3). This GPS antenna 11 is a patch antenna for receiving satellite signals from a plurality of GPS satellites 15 orbiting the Earth on fixed orbits in space. This GPS antenna 11 is located on the opposite side of the dial 12 as the side on which the time is displayed. The dial 12 is made of plastic or other material that passes RF signals such as the signals transmitted from the GPS satellites 15.

The GPS satellite 15 is an example of a positioning information satellite, and a plurality of GPS satellites 15 are orbiting the Earth in space.

The outside case 17 is made of stainless steel, titanium, or other metal. The bezel 16 is preferably ceramic in order to improve the reception performance of the GPS antenna 11 that receives satellite signals from the GPS satellites 15.

The battery 24 is a lithium-ion battery or other type of storage battery. A magnetic sheet 21 is disposed below the battery 24, and a charging coil 22 is disposed with the magnetic sheet 21 between it and the battery 24. The battery 24 can therefore be charged by the charging coil 22 by means of electromagnetic induction from an external charger. The magnetic sheet 21 can also divert the magnetic field. The magnetic sheet 21 therefore reduces the effect of the battery 24 and enables the efficient transmission of energy. A back glass unit 23 is also disposed in the center part of the back cover 26 to facilitate power transmission.

The GPS wristwatch 10 is arranged as described above.

As shown in FIG. 3, the GPS wristwatch 10 also has a time display device 45, a GPS device 40, and a time adjustment device 44, and functions as a computer. The display 14 shown in FIG. 1 and FIG. 2 is also connected to this arrangement.

The arrangement shown in FIG. 3 is further described below.

As shown in FIG. 3, the GPS wristwatch 10 has a reception unit such as the GPS device 40 that passes signals received from an GPS satellite 15 in FIG. 1 from the GPS antenna 11 through a filter (SAW) 31 and RF (radio frequency) unit 27 to extract the signal from the baseband unit 30.

More specifically, the filter (SAW) 31 is a bandpass filter and in this embodiment of the invention extracts a 1.5-GHz satellite signal. The extracted satellite signal is amplified by an LNA, mixed by a mixer 46 with a signal supplied from a VCO 41, and down-converted to an IF (intermediate frequency) signal. The clock signal for the PLL 34 is generated by a temperature-compensated crystal oscillator (TCXO) 32.

The down-converted satellite signal passes the IF filter 35 and IF amplifier, and is converted to a digital signal by the A/D converter 42. The baseband unit 30 then processes the satellite signal based on a control signal. The time data output by the baseband unit 30 is stored in a storage unit, and the corrected time information is displayed by means of a drive circuit 43.

The receiver 40a, which is a part of the GPS device 40, thus includes an RF unit 27 and baseband unit 30. The RF unit 27 includes a PLL 34, IF filter 35, VCO 41, and A/D converter 42.

The baseband unit 30 also includes a digital signal processor (DSP) 39, a CPU (central processing unit) 36, and SRAM (static random access memory) 37, and is connected to the temperature-compensated crystal oscillator (TCXO) 32 and flash memory 33.

A real-time clock (RTC) 38 is disposed to the control unit 20, and is an example of a time information generating unit that generates time information. The real-time clock 38 counts up at a reference clock that is determined by a crystal oscillator connected to the control unit 20.

The charging coil 22 charges the storage battery, which is the battery 24, with power through a charging control circuit 28, and supplies drive power to the time adjustment device 44 and other parts through a regulator 29. The control unit 20 also outputs a control signal to the receiver 40a, and the reception operation of the GPS device 40 can therefore be controlled through the control unit 20.

The timekeeping mechanism according to this embodiment of the invention is thus an electronic timepiece.

The real-time clock 38 is an example of a time information generating unit for generating time information.

The GPS device 40 is an example of a reception unit for receiving satellite signals transmitted from a positioning information satellite (such as GPS satellite 15).

The internal time data 73b (see FIG. 7) that is the time information generated by the real-time clock 38 is an example of generated time information.

Figure 4:
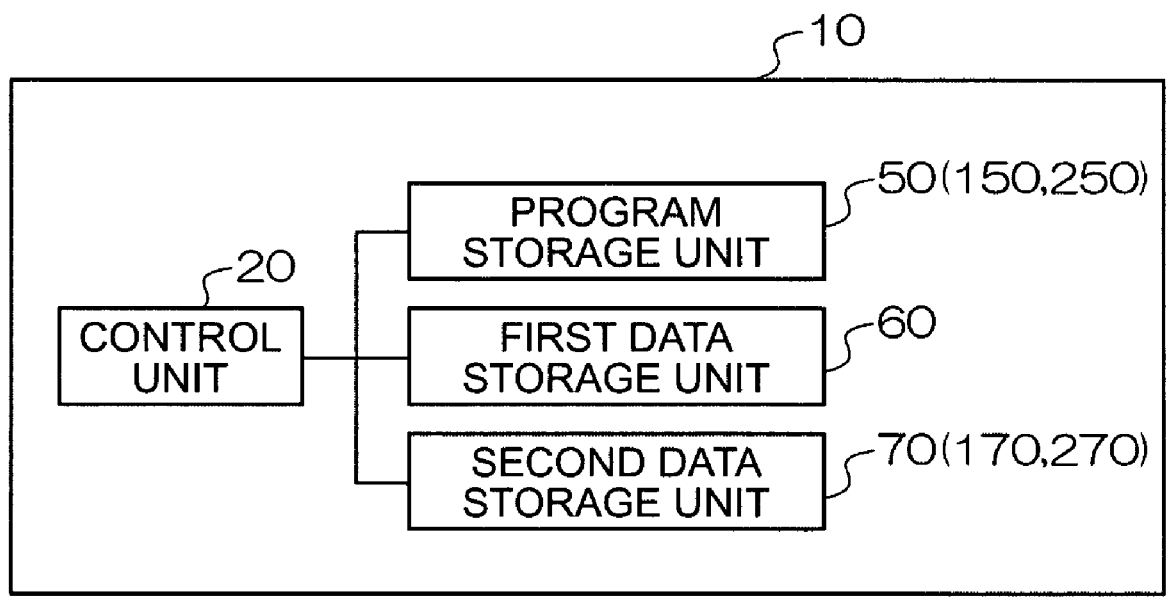
FIG. 4 is a schematic diagram showing the main software configuration of the wristwatch with a GPS time adjustment device shown in FIG. 1 and FIG. 2.

FIG. 4 to FIG. 7 schematically describe the main software structure of the GPS wristwatch 10, FIG. 4 being an overview.

As shown in FIG. 4, the GPS wristwatch 10 has a control unit 20. The control unit 20 runs programs stored in the program storage unit 50 in FIG. 4, and processes data stored in the first data storage unit 60 and data stored in the second data storage unit 70.

FIG. 4 shows the program storage unit 50, first data storage unit 60, and second data storage unit 70 separately, but the data is not actually stored separately and is shown this way for convenience only.

Figure 6:
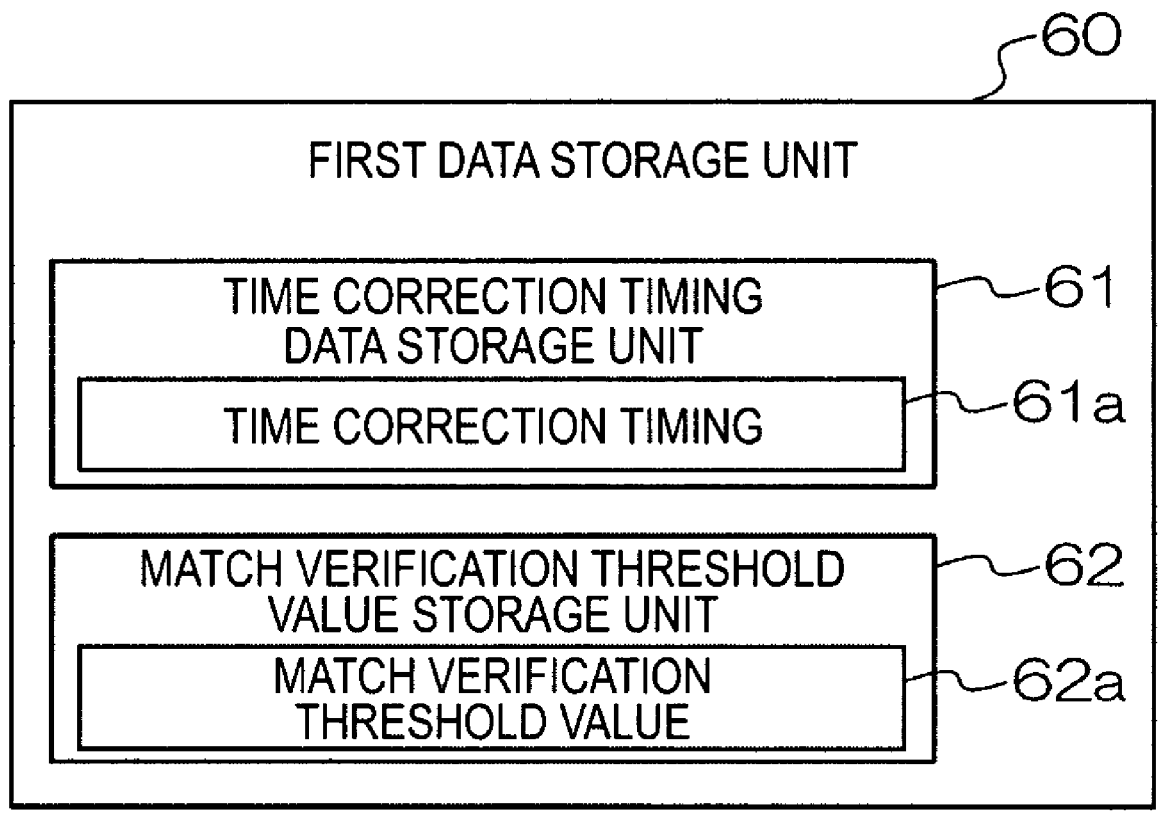
FIG. 6 shows data stored in the first data storage unit shown in FIG. 4.
Figure 7:
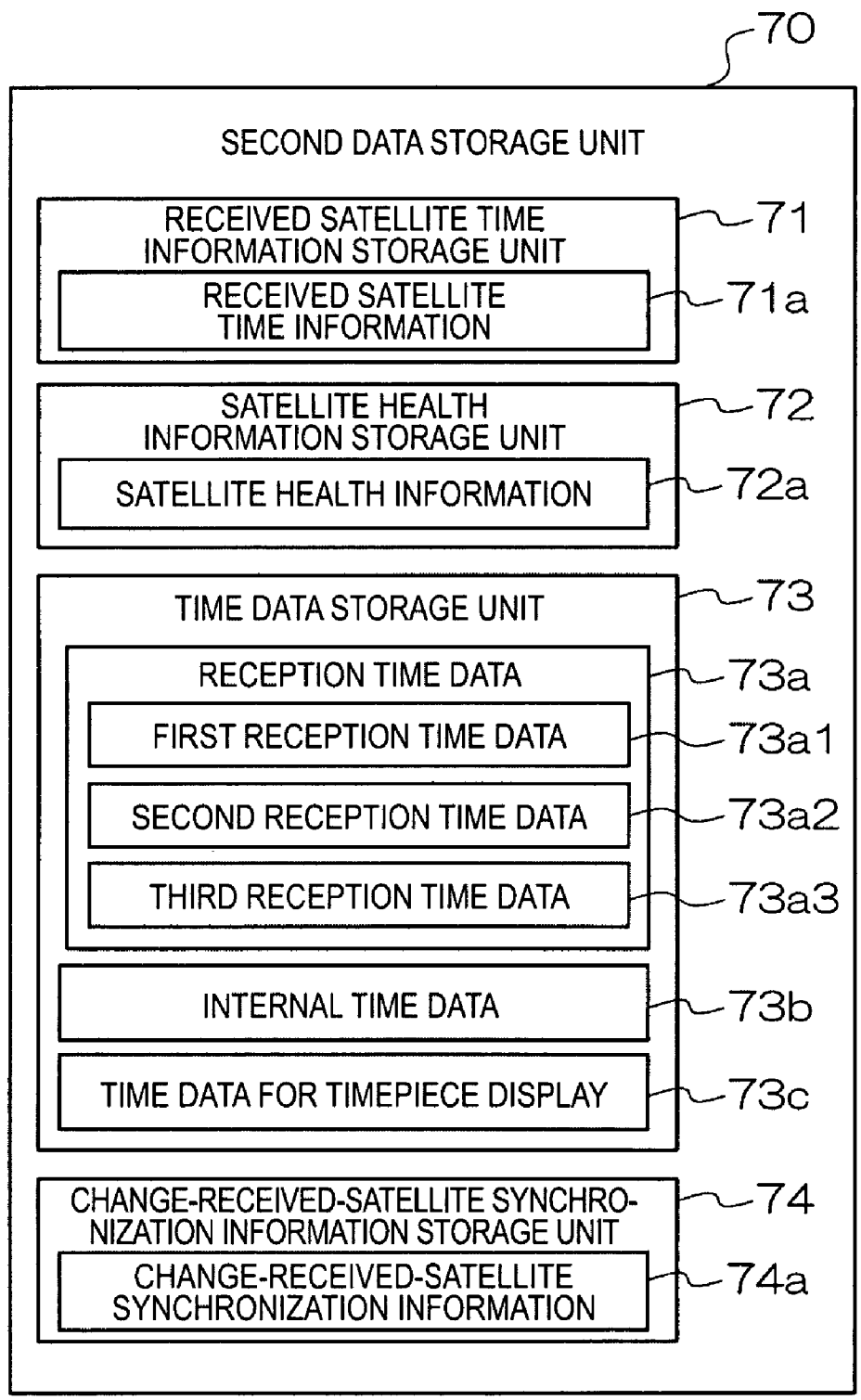
FIG. 7 shows data stored in the second data storage unit shown in FIG. 4.

The first data storage unit 60 in FIG. 6 stores primarily previously stored data, and the second data storage unit 70 in FIG. 7 stores primarily data resulting from processing the data in the first data storage unit 60 by means of a program stored in the program storage unit 50.

Figure 5:
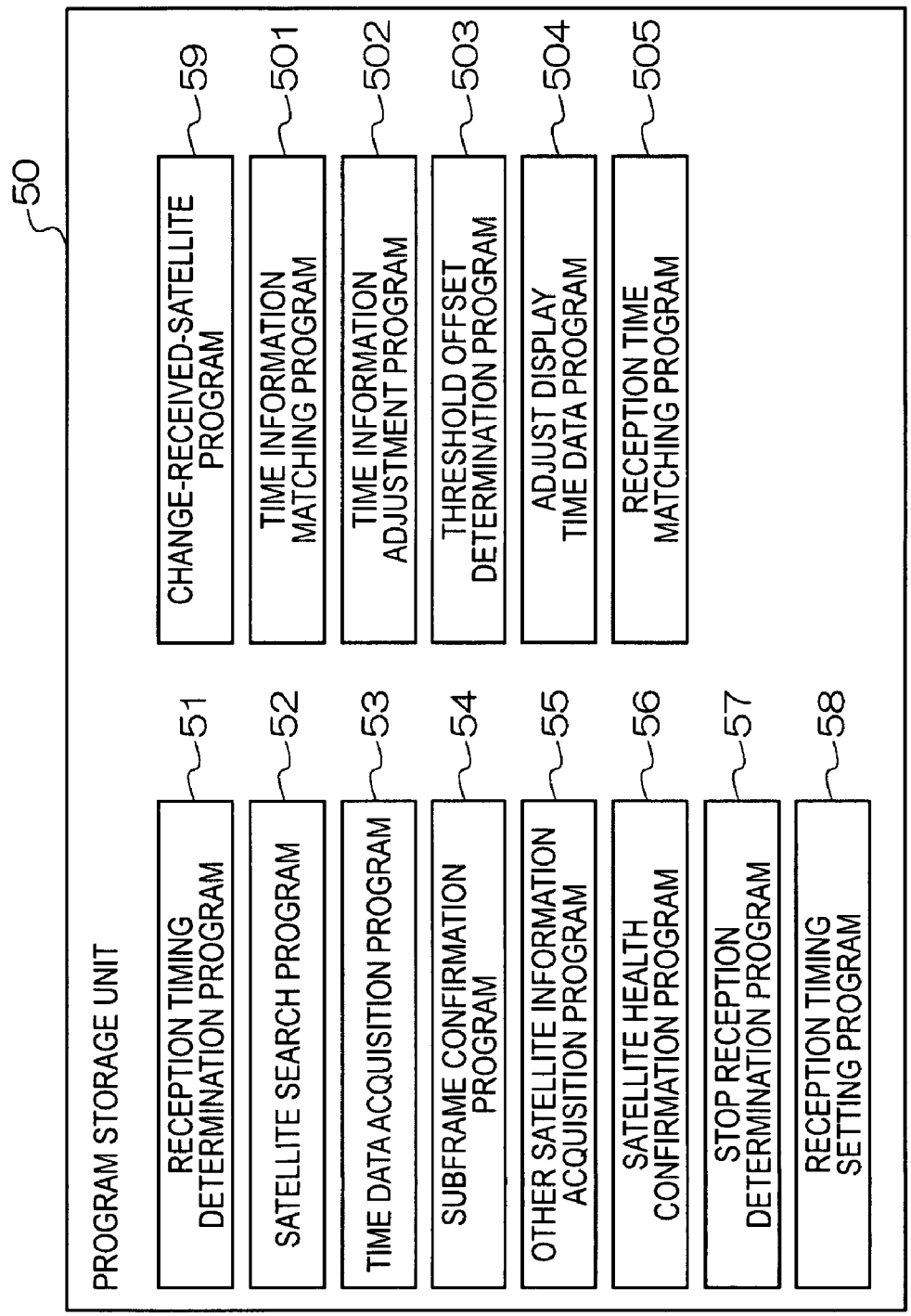
FIG. 5 shows data stored in the program storage unit shown in FIG. 4.

FIG. 5 shows the data stored in the program storage unit 50 in FIG. 4. FIG. 6 shows the data stored in the first data storage unit 60 in FIG. 4. FIG. 7 shows the data stored in the second data storage unit 70 in FIG. 4.

Figure 8:
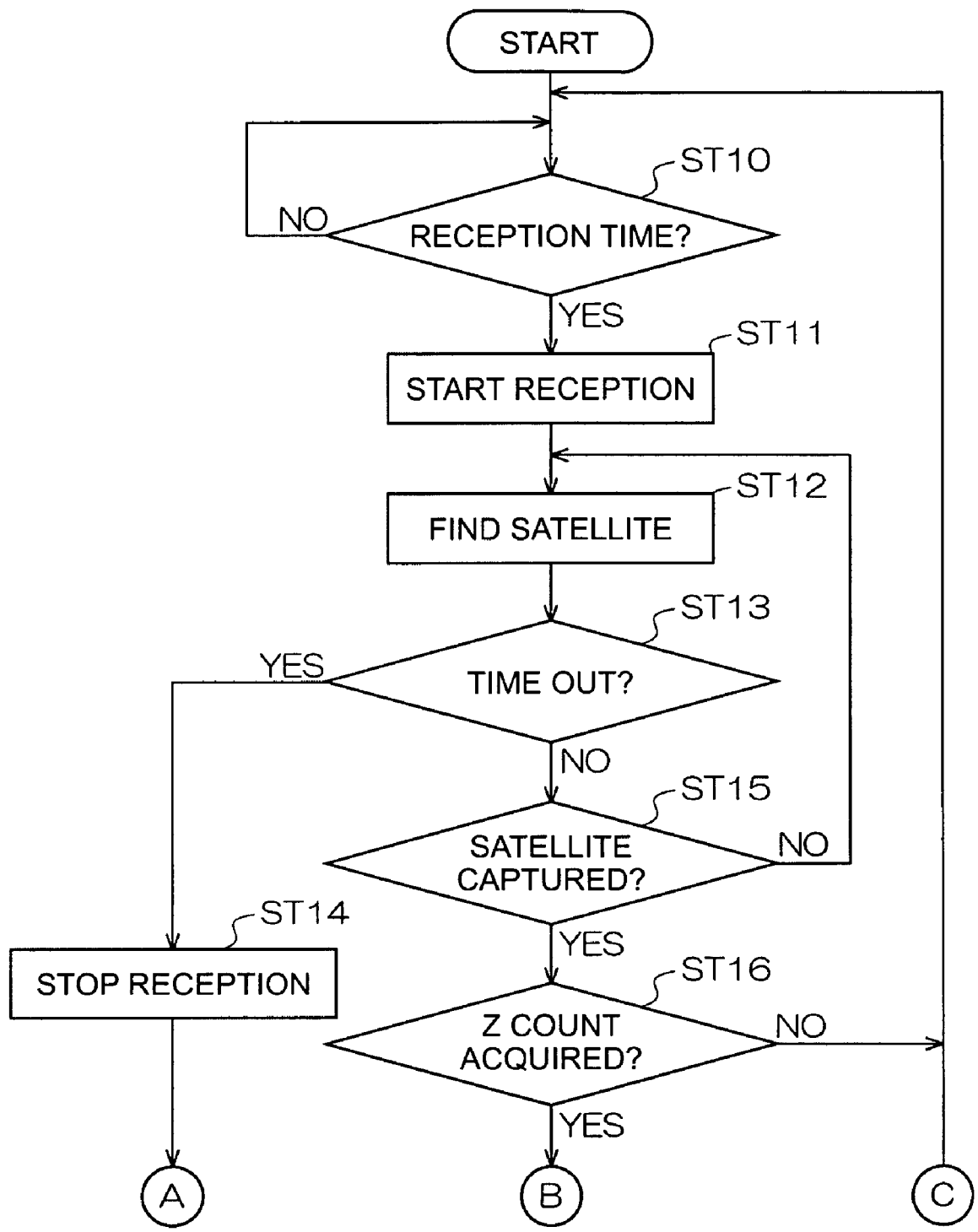
FIG. 8 is a flow chart describing the main steps in the operation of the wristwatch with a GPS time adjustment device according to the first embodiment of the invention.
Figure 9:
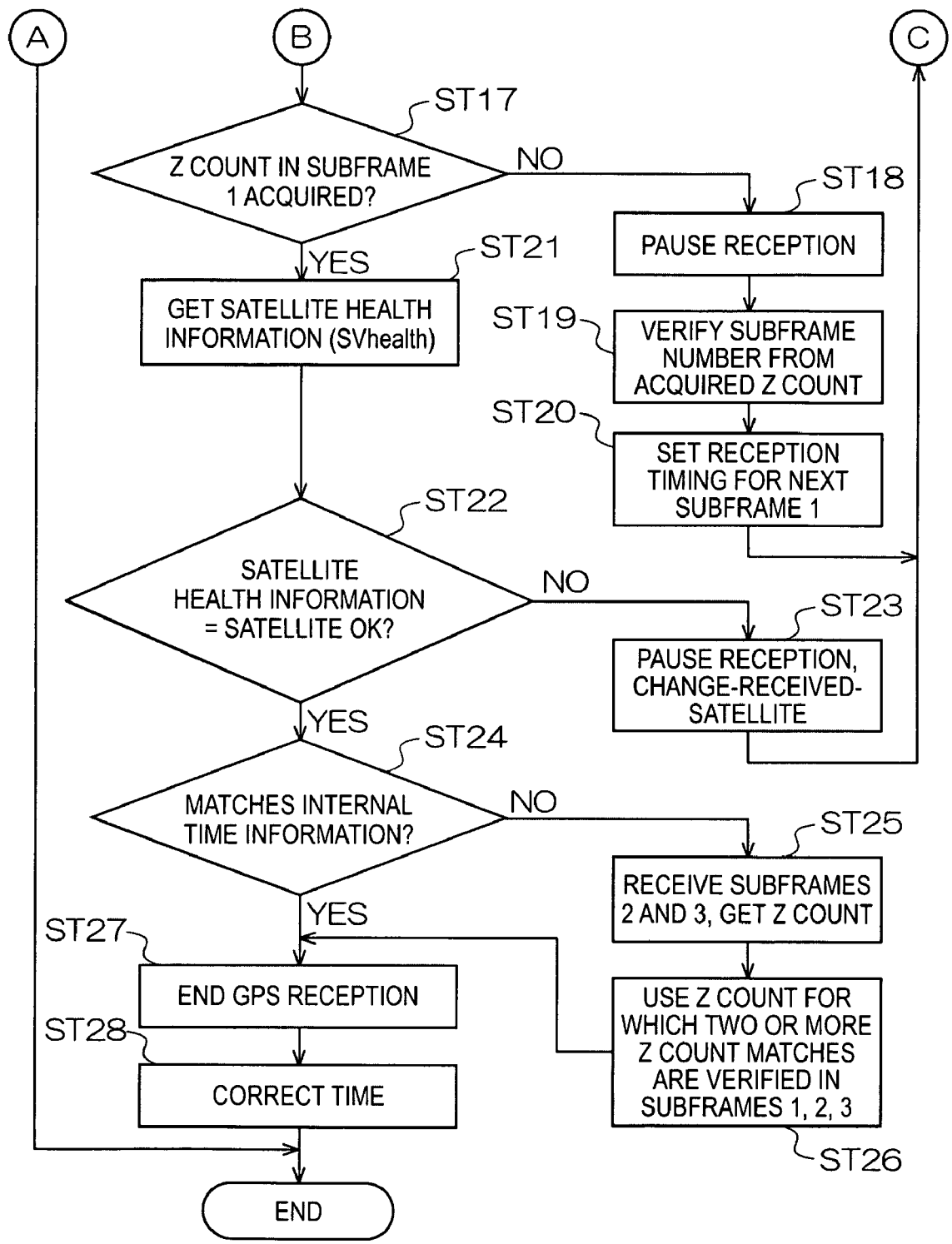
FIG. 9 is a flow chart describing the main steps in the operation of the wristwatch with a GPS time adjustment device according to the first embodiment of the invention.

FIG. 8 and FIG. 9 are flow charts describing the main steps in the operation of the GPS wristwatch 10 according to this embodiment of the invention.

The programs and data shown in FIG. 5 to FIG. 7 are described below while describing the operation of the GPS wristwatch 10 according to this embodiment of the invention with reference to the flow charts in FIG. 8 and FIG. 9.

In step ST10 in FIG. 8 the GPS wristwatch 10 determines if it is time to receive the satellite signal.

Whether the satellite signal reception time has come is determined by the reception timing determination program 51 in FIG. 5 determining if the time information generated by the real-time clock 38 equals the time correction timing 61a in FIG. 6.

The time correction timing 61a is set based on the following time, for example. If the GPS wristwatch 10 is accurate to a maximum of approximately 0.5 second per day, the number of times per day that the satellite signal is received from the GPS satellite 15 to correct the time can be limited to 2 or 3 times per day. The GPS wristwatch 10 is therefore preferably in an environment where receiving satellite signals from a particular GPS satellite 15 is good when the signal is to be received. The time correction timing 61a that determines the reception timing is therefore preferably set based on a time when the reception environment can be expected to be good. A time, such as 2:00 or 3:00 a.m., when the likelihood is high that the GPS wristwatch 10 is not being used by the user and is removed from the wrist and left stationary indoors is preferably used for reference. A time when the user is wearing the GPS wristwatch 10 and the likelihood is high that the GPS wristwatch 10 is outdoors, such as the typical commuting time of 7:00 or 8:00 a.m., could also be used.

In this embodiment of the invention the time correction timing 61a is set so that the time data can be acquired and the time can be corrected at second 0 or second 30.

As further described below, the satellite signals from the GPS satellites 15 are transmitted in data frames. Each frame contains five subframes (subframe 1 to subframe 5). The time correction timing 61a is thus set before the beginning of subframe 1 at the beginning of any frame. "Before the beginning of subframe 1" means before the preamble at the beginning of subframe 1, and allows for the startup time RF unit 27 of the GPS device 40 and for the GPS satellite 15 search time, and is therefore set to approximately 10 seconds before the beginning of subframe 1, for example. If the reception timing is referenced to 2:00 a.m., for example, the time correction timing 61a is set so that adjusting the time is timed to second 0. More specifically, the time correction timing 61a is set so to approximately 10 seconds before the reference time of 2:00 a.m.

The reception timing determination program 51 in FIG. 5 then determines if the time information generated by the real-time clock 38 indicates 1:59:50, which is the time correction timing 61a. Alternatively, if the reception timing is referenced to 7:00 a.m., the time correction timing 61a may be set so that the time is corrected at second 30. In this case the reception timing determination program 51 in FIG. 5 determines if the time information generated by the real-time clock 38 indicates the time correction timing 61a of 7:00:20.

The reception timing relating to the time adjustment timing is a predetermined timing, such as when the second hand of the hands 13 disposed to the dial 12 of the time display device 45 indicates the 0 or 30 second, and is when the time displayed by the time display device 45 is corrected. As described below, because the beginning of subframe 1 is transmitted at the 0 or 30 second, the beginning of subframe 1 can be detected and the time information can be acquired if the GPS device 40 signal can be received timed to the 0 or 30 second.

The reception timing determination program 51 in FIG. 5 then counts based on the real-time clock 38, and determines if the current time equals the time correction timing 61a. More specifically, the reception timing determination program 51 is an example of a starting information generating unit that generates the reception timing based on the internal time data 73b generated by the real-time clock 38.

If the current time does not equal the reception timing, counting continues until the reception timing is reached.

If the reception timing determination program 51 in FIG. 5 determines that it is time to receive the satellite signal, control goes to step ST11 and reception starts. The GPS device 40 is therefore activated and steps are taken to enable searching for a GPS satellite 15.

Yet more specifically, as shown in FIG. 3, the GPS device 40 starts operating, and the C/A code pattern of the GPS satellite 15 is generated in order to receive the GPS signal as the satellite signal from the GPS antenna 11.

Control then goes to step ST12 and a satellite search begins. More specifically, the satellite search program 52 in FIG. 5 adjusts the timing at which the GPS device 40 generates the C/A code of the GPS satellite 15, and searches for a GPS satellite 15 that can be synchronized.

Proceeding to step ST13, the GPS device 40 adjusts the timing at which the GPS device 40 generates the C/A code of the GPS satellite 15, and determines if the time until synchronization is possible is greater than or equal to a prescribed time-out period. More specifically, the stop reception determination program 57 in FIG. 5 counts the time from the start of reception, and determines how much time is required to find a GPS satellite 15. If the required time exceeds a predetermined time, operation times out, control goes to step ST14, and reception ends. That is, the stop reception determination program 57 in FIG. 5 determines that a time out has occurred if a predetermined time has passed, and unconditionally terminates operation of the GPS device 40.

As a result, if the GPS wristwatch 10 is located where reception is not possible, such as indoors, power will be consumed needlessly no matter how long the GPS device 40 operates. Operation of the GPS device 40 is therefore terminated when this predetermined time has passed so that needless consumption of power can be reduced.

If operation has not timed out in step ST13, control goes to step ST15.

Step ST15 determines if a GPS satellite 15 was captured. More specifically, the satellite search program 52 in FIG. 5 causes the GPS device 40 to search for and synchronize with a GPS satellite 15. The satellite search program 52 then determines of the navigation message that is the satellite signal from the GPS satellite 15 as described below can be decoded.

If a satellite cannot be captured, the procedure loops to step ST12 and the GPS satellite 15 search repeats to find a different GPS satellite 15.

If a GPS satellite 15 is captured, control goes to step ST16 to acquire the navigation message from the satellite signal.

Before proceeding to step ST16, the navigation message carried by the signal (satellite signal) transmitted from the GPS satellite 15 is described below.

FIG. 18 describes the structure of the GPS satellite signal.

Figure 18A:
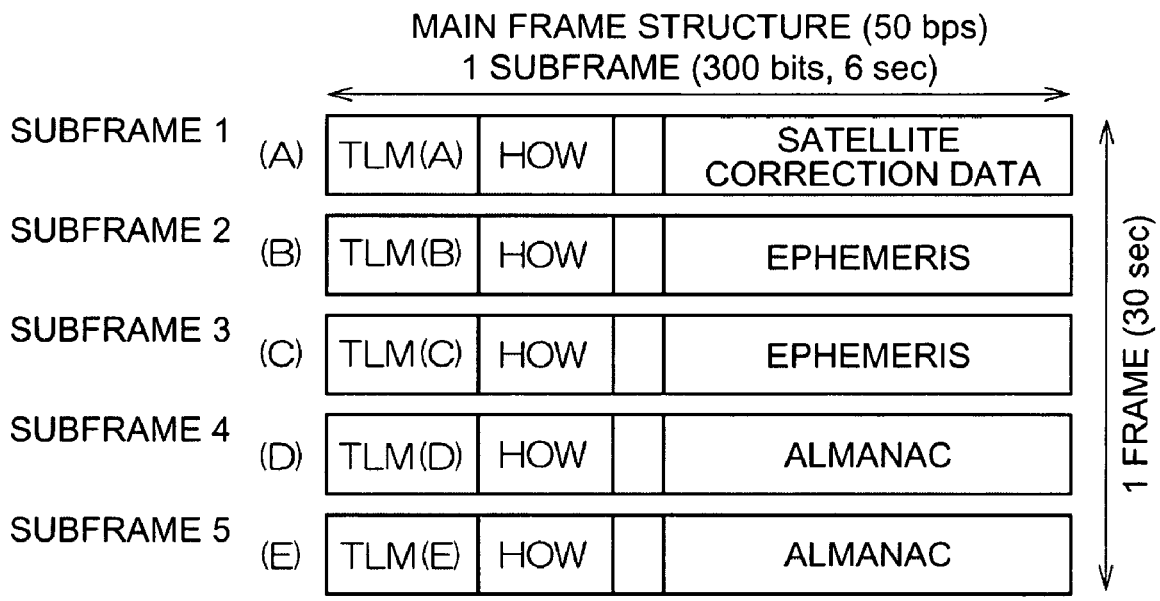
FIGS. 18A and 18B show the structure of the GPS signal.

As shown in FIG. 18A, signals are transmitted from each of the GPS satellites 15 in units of one frame every 30 seconds. One frame contains five subframes (subframe 1 to subframe 5). Each subframe is 6 seconds long, and contains 10 words (each word is 0.6 second).

Figure 18B:
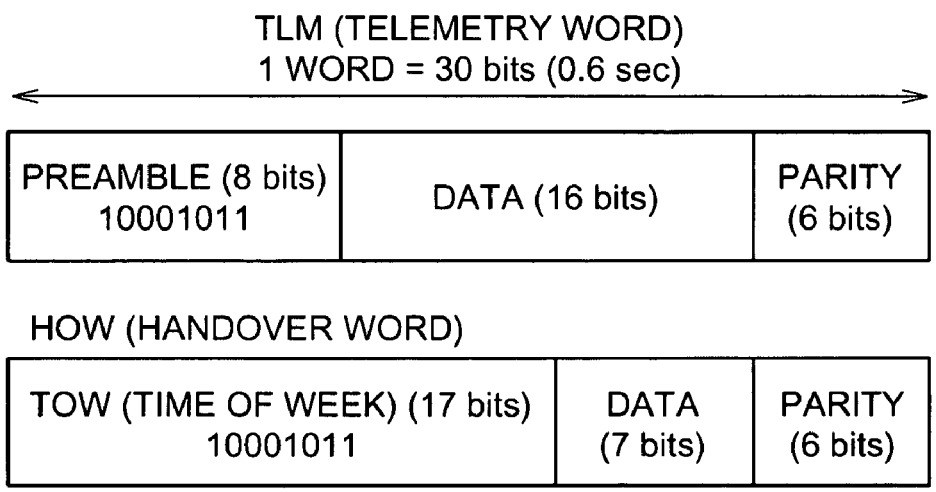

The first word in each subframe is a telemetry (TLM) word storing the TLM data, and each TLM word starts with a preamble as shown in FIG. 18B.

The TLM word is followed by a handover word HOW storing the HOW (handover) data, and each HOW starts with the time of week (TOW) (also called the Z count) indicating the GPS time information of the GPS satellite.

The GPS time is the number of seconds since 00:00:00 Sunday night, and is reset to zero at precisely 00:00:00 every Sunday night. The GPS time is thus information expressing the time since the start of the week in seconds, and the elapsed time is a number expressed in 1.5 second units. The GPS time is also called the Z count (referred to below as the Z count data), and enables the GPS device 40 to know the current time.

The same GPS week number is added to the GPS time throughout the week, and is contained as the week number data in the navigation message or satellite signal from the GPS satellite 15.

The starting point for the GPS time information is 00:00:00 of Jan. 6, 1980 referenced to the Coordinated Universal Time (UTC), and the week that started on this day is week 0. The GPS receiver can therefore get the precise GPS time from the week number and the elapsed time (number of seconds).

The week number is updated once a week.

Once the receiver gets the week number and counts the seconds passed since the week number was acquired, the current week number of the GPS satellite 15 can be known from the acquired week number and the elapsed time without getting the week number data again. As a result, the approximate current GPS time can be known once the Z count data is acquired. Power consumption can therefore normally be reduced because the reception operation of the receiver can be completed in a short time by acquiring only the Z count data.

If for some reason the acquired week number data is deleted, the elapsed time count from when the week number was acquired is offset, or a predetermined time has passed since the week number data was acquired, the week number data can be acquired again from the satellite signal received from a GPS satellite 15, and the receiver can get the current GPS time from the newly received week number data and Z count data.

As shown in FIG. 18, the main frame of the navigation message contained in the signal from the GPS satellite 15 contains 1500 bits and is transmitted at 50 bps.

The main frame is divided into five subframes of 300 bits each (see FIG. 18A).

One frame is equivalent to 30 seconds. One subframe is therefore equivalent to 6 seconds. As described above, the TLM word and the Z count data (TOW) in the HOW word are contained in the first two words of each subframe. The Z count data starts from subframe 1, and six seconds of data is contained in each subframe. Subframe 1 to subframe 5 therefore contain the TLM word and the Z count (TOW) data in the HOW word. The Z count (TOW) data is therefore the time information for the next subframe. For example, the Z count data in subframe 1 is the time data for subframe 2.

As shown in FIG. 18A and FIG. 18B, the navigation message carried in the satellite signal from the GPS satellite 15 includes the preamble data and the TOW in the HOW word, and the subframe data, including the ephemeris (detailed orbit information for the transmitting GPS satellite 15), almanac (orbit information for all GPS satellites 15), and the UTC data. More specifically, the subframe data of the navigation message is carried in subframe 1 to subframe 5, and the data in these five subframes render one frame data unit. The subframe data is divided into words 1 to 10.

Figure 17:
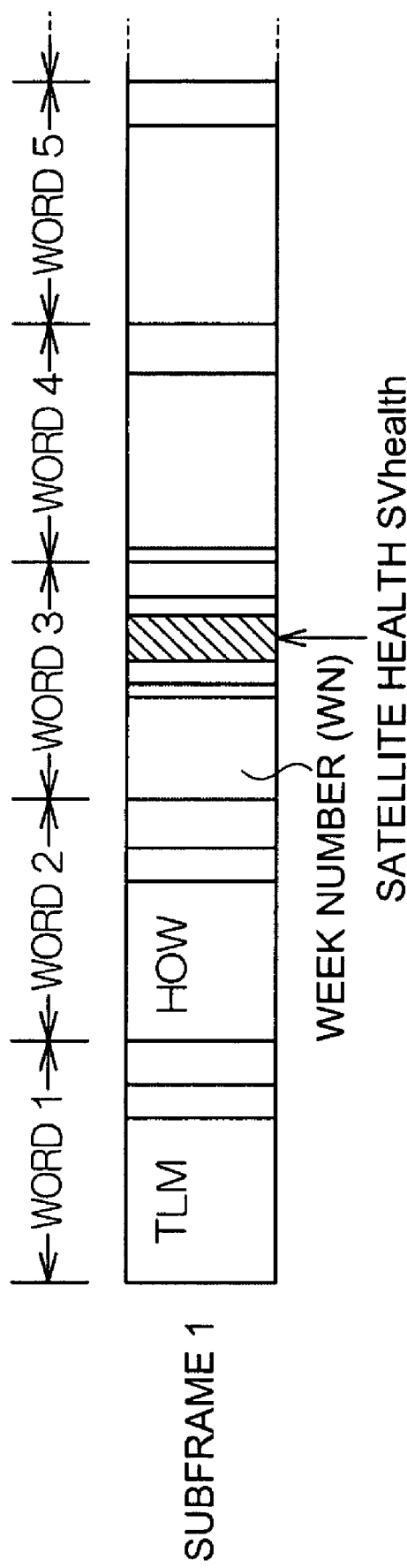
FIG. 17 shows the structure of word data in a subframe 1.

As shown in FIG. 17, word 3 in subframe 1 contains the week number (WN) data and satellite health (SVhealth) data, which is a signal describing the operating condition of the GPS satellite 15. FIG. 17 is a schematic diagram describing part of the word data in word 1 to word 5 in subframe 1.

Because the signals described above are transmitted from the GPS satellites 15, GPS signal reception as used herein means phase synchronization with the C/A code from the GPS satellite 15.

More specifically, the GPS device 40 that is the receiver must synchronize with the signal from the GPS satellite 15 in order to get the frame data from a particular GPS satellite 15.

The C/A code is used for synchronization with 1 ms precision, and is a 1023-chip pseudo random noise code that repeats every 1 ms. The C/A code (1023 chip (1 ms) code) is different for each of the plural GPS satellites 15, and is unique to a particular satellite.

Therefore, to receive the satellite signal from a particular GPS satellite 15, the GPS device 40 (reception unit) generates the unique C/A code for a particular GPS satellite 15 and phase synchronizes with the C/A code from the selected GPS satellite 15 to receive the satellite signal.

By synchronizing with the C/A code (1023 chips (1 ms)), the preamble of the TLM word and the HOW word of each subframe can be received, and the Z count data can be acquired from the HOW word. After acquiring the TLM word and the Z count (TOW) from the HOW word, the GPS device 40 can then acquire the week number (WN) data and the satellite health SVhealth data (see FIG. 17).

The operating condition of the received GPS satellite 15 can be determined from the satellite health SVhealth data. Whether some problem has developed with the GPS satellite 15 or whether the satellite is a test satellite can be determined from this satellite health SVhealth data.

Whether the acquired Z count data can be trusted can be determined with a parity check. More specifically, the parity data following the TOW data in the HOW word can be used to verify if the received data is correct. If an error is detected from the parity data, there is something wrong with the Z count data and the Z count data is not used to correct the internal clock.

The frame data shown in FIG. 18 is thus an example of information carried in frame units, and the subframe data is an example of information carried in subframe units, and both are examples of a specific unit of the satellite signal. The Z count (TOW) data is an example of satellite time information from a positioning information satellite (GPS satellite 15). The week number (WN) data is an example of week number information, which is the number of weeks from the origin of the satellite time information. The Z count data, week number (WN) data, TLM word, and HOW word are examples of satellite signal information. The satellite health SVhealth data is an example of positioning information satellite health information describing the operating condition of the positioning information satellite, and is an example of another satellite information unit.

The navigation message that is the satellite signal transmitted from the GPS satellite 15 is as described above.

If a satellite is captured in step ST15, control goes to step ST16. Step ST16 determines if the Z count data was acquired.

More specifically, the time data acquisition program 53 in FIG. 5 gets the Z count (TOW) data, which is an example of the satellite time information, from the navigation message that is carried by the satellite signal from a GPS satellite 15. The Z count (TOW) data is then stored as the received satellite time information 71a in the received satellite time information storage unit 71 in FIG. 7.

More specifically, acquiring the Z count data means that the Z count (TOW) data can be acquired after synchronizing with the preamble of the TLM word.

The time information matching program 501 in FIG. 5 then determines if the received satellite time information 71a in FIG. 7 that is the acquired Z count (TOW) data can be trusted. The time information matching program 501 executes a parity check as described above. More specifically, the time information matching program 501 verifies whether the received data is correct based on the parity data following the TOW data of the HOW word. If an error in the Z count data is detected by the parity check executed by the time information matching program 501, there is some sort of problem with the acquired Z count data and the Z count data is therefore not used to correct the internal clock. As a result, if an error is detected the threshold offset determination program 503 in FIG. 5 determines that the Z count data was not acquired and control goes to step ST10.

However, if the time information matching program 501 does not detect an error, the time data acquisition program 53 in FIG. 5 determines that the acquired Z count data can be used to correct the time, and stores the received satellite time information 71a in the received satellite time information storage unit 71 as the first reception time data 73a1 of the reception time data 73a in the time data storage unit 73. Control goes to step ST17 in FIG. 9 in this case.

Step ST17 then determines if the Z count data from subframe 1 was acquired.

More specifically, the subframe confirmation program 54 in FIG. 5 determines based on the acquired Z count data if it is the Z count data from subframe 1. That is, the subframe confirmation program 54 in FIG. 5 determines from the first reception time data 73a1 in the reception time data 73a in the time data storage unit 73 in FIG. 7 if this first reception time data 73a1 is the Z count data from subframe 1.

There are cases in which the GPS device 40 attempts to receive and acquire the Z count data from subframe 1 at a predetermined reception timing but actually receives the Z count (TOW) data from subframe 2, that is, the next subframe, or gets the Z count (TOW) data from subframe 5, which is subframe data from the previous frame.

In such cases the GPS wristwatch 10 according to this embodiment of the invention can reliably get the actual Z count (TOW) data for subframe 1 because the GPS wristwatch 10 has the subframe confirmation program 54 in FIG. 5.

If the subframe confirmation program 54 in FIG. 5 determines in step ST17 that the first reception time data 73a1, which is the acquired Z count data, is not the Z count data for subframe 1, control goes to step ST18.

In step ST18 the stop reception determination program 57 pauses the reception operation of the GPS device 40.

The subframe number of the subframe data is then confirmed from the acquired Z count (TOW) data in step ST19.

As described above, the Z count (TOW) data is transmitted from the GPS satellite 15 at precise 6 second intervals synchronized to the UTC. The GPS wristwatch 10 therefore knows from the acquired Z count data from which subframe the data was acquired. As a result, if the precision of the real-time clock 38, which is an example of a time generating unit for generating the internal time data 73b, is offset greatly, the timing at which reception starts will be offset accordingly if the precision of the real-time clock 38 is offset at least 6 seconds from the actual time. This means that while the Z count data from subframe 1 is supposed to be acquired, the acquired Z count data is from another subframe. The subframe confirmation program 54 in FIG. 5 therefore enables the GPS wristwatch 10 to verify from which subframe the data was acquired. The subframe number of the acquired subframe data is therefore verified in step ST19, and control goes to step ST20.

Step ST20 sets the reception timing of the next subframe 1. More specifically, the reception timing setting program 58 in FIG. 5 sets the reception timing of the next subframe 1 based on the verified subframe number and the internal time data 73b of the acquired Z count data. Control then returns to step ST10 and reception starts when the current time advances to the set reception timing. Operation of the GPS device 40, which is an example of the reception unit, is paused while waiting for the set reception timing.

FIG. 9 shows control returning from step ST23 to C, which means that control proceeds to C in FIG. 8 and thus returns to step ST10. A and B in FIG. 8 and FIG. 9 similarly indicate flow control.

If step ST17 verifies that the Z count data was acquired from subframe 1, control goes to step ST21. The satellite health SVhealth data described above is acquired in step ST21.

More specifically, the other satellite information acquisition program 55 in FIG. 5 gets the satellite health SVhealth data contained in word 3 of subframe 1 in the satellite signal from the GPS satellite 15 as described above. The other satellite information acquisition program 55 in FIG. 5 then stores the acquired satellite health data as the satellite health information 72a in the satellite health information storage unit 72 in FIG. 7.

Control then goes to step ST22 to determine if the satellite health information 72a indicates that the GPS satellite 15 is functioning correctly. More specifically, the satellite health confirmation program 56 in FIG. 5 evaluates the condition of the GPS satellite 15 based on the satellite health information 72a in FIG. 7, which is the acquired satellite health data.

In other words, as described above, the satellite health information 72a, which is the acquired satellite health data, is data representing the operating condition of the transmitting GPS satellite 15, and is a code describing the state of the satellite. If the satellite health information 72a is a code value other than 0, the satellite health information 72a indicates some problem and the receiver knows that the GPS satellite 15 cannot be used. If the satellite is healthy, the satellite health information 72a is a code value of 0, and the receiver knows that the satellite is functioning correctly.

It is therefore possible to determine based on the satellite health information 72a in FIG. 7 if there is a problem with the GPS satellite 15. Yet more specifically, whether the satellite signal from the GPS satellite 15 is reliable can be determined.

If in step ST22 the satellite health information 72a in FIG. 7 indicates a problem with the GPS satellite 15, control goes to step ST23. In step ST23, the stop reception determination program 57 in FIG. 5 pauses reception by the GPS device 40. The change-received-satellite program 59 in FIG. 5 then stores the change-received-satellite synchronization information 74a in the change-received-satellite synchronization information storage unit 74 in FIG. 7 to change the GPS satellite 15 from signals are received. Control then returns to step ST10, and reception starts based on this change-received-satellite synchronization information 74a.

As a result, because signals from a different GPS satellite 15 are received if the satellite health information 72a acquired from the GPS satellite 15 does not indicate a healthy satellite, that is, if it is determined that there is a problem with the GPS satellite 15, the time information can be corrected using a satellite signal from a different GPS satellite 15 that is functioning normally. As a result, the time can be reliably corrected with high precision. Note that the GPS satellite 15 is an example of a positioning information satellite. The satellite health information 72a is an example of positioning information satellite health information. The positioning information satellite health information is the satellite health data acquired from the GPS satellite 15.

If step ST22 determines that the satellite health information 72a does not indicate a problem with the GPS satellite 15, control goes to step ST24.

Whether there is a match with the internal time information is determined in step ST24. More specifically, the threshold offset determination program 503 in FIG. 5 determines if the offset between the internal time data 73b in FIG. 7, which is generated by the real-time clock 38 and indicates the current time, and the first reception time data 73a1 of the reception time data 73a is equal to the match verification threshold value 62a of the match verification threshold value storage unit 62 in FIG. 6. The match verification threshold value 62a is approximately 0.5 second per day in this embodiment of the invention. This is due to the precision of the crystal (crystal oscillator) connected to the control unit 20 (FIG. 3) that is the reference clock generator.

The real-time clock 38 is incremented based on the reference clock, which is determined by the crystal oscillator connected to the control unit 20.

If a match is not confirmed in step ST24, control goes to step ST25.

The internal time data 73b is a value related to the performance of the real-time clock 38 that generates it. The internal time data 73b is affected by the frequency shift (also referred to below as the frequency shift of the real-time clock 38) of the crystal (crystal oscillator) that is used as the reference clock of the real-time clock 38. If for some reason this frequency shift is great, and the offset between the internal time data 73b and the first reception time data 73a1 in FIG. 7 becomes greater than the match verification threshold value 62*a* in FIG. 6, the data does not match and control goes to step ST25.

In step ST25 the time data acquisition program 53 in FIG. 5 gets the Z count data from subframe 2 and subframe 3, which are the next subframes received from the GPS satellite 15 after the Z count data from subframe 1 is acquired. The Z count data from subframe 2 and the Z count data from subframe 3 are then stored to the second reception time data 73*a*2 and third reception time data 73*a*3, respectively, of the reception time data 73*a* in the time data storage unit 73 in FIG. 7. Note that the time information matching program 501 in FIG. 5 described above runs a parity check to determine if the acquired Z count data is correct.

Step ST26 then selects the Z count data for which two or more matches were confirmed from among the Z count data acquired from subframe 1, subframe 2, and subframe 3. That is, the reception time matching program 505 in FIG. 5 compares the first reception time data 73*a*1, the second reception time data 73*a*2, and the third reception time data 73*a*3 constituting the reception time data 73*a* in the time data storage unit 73 in FIG. 7, and if the offset is the 6 seconds or 12 seconds of the subframe data, uses the reception time data 73*a* for which a match is verified. More specifically, one subframe is transmitted every 6 seconds, and the Z count data from each subframe is therefore offset 6 seconds from the Z count data in the adjacent subframes. Therefore, because the first reception time data 73*a*1 is the Z count data for subframe 1 and the second reception time data 73*a*2 is the Z count data for subframe 2, there should be a 6 second offset between the Z count data from subframe 1 and subframe 2. In addition, because the third reception time data 73*a*3 is the Z count data from subframe 3, there is a 12 second difference between it and the first reception time data 73*a*1. There is also a 6 second difference between the second reception time data 73*a*2 and the third reception time data 73*a*3. The reception time data 73*a* that is within the offset of the subframe data size is therefore used. In addition, as described above, if the frequency shift of the real-time clock 38 that generates the internal time data 73*b* is large, whether the reception time data 73*a* matches the internal time data 73*b* is not determined.

Figure 16:
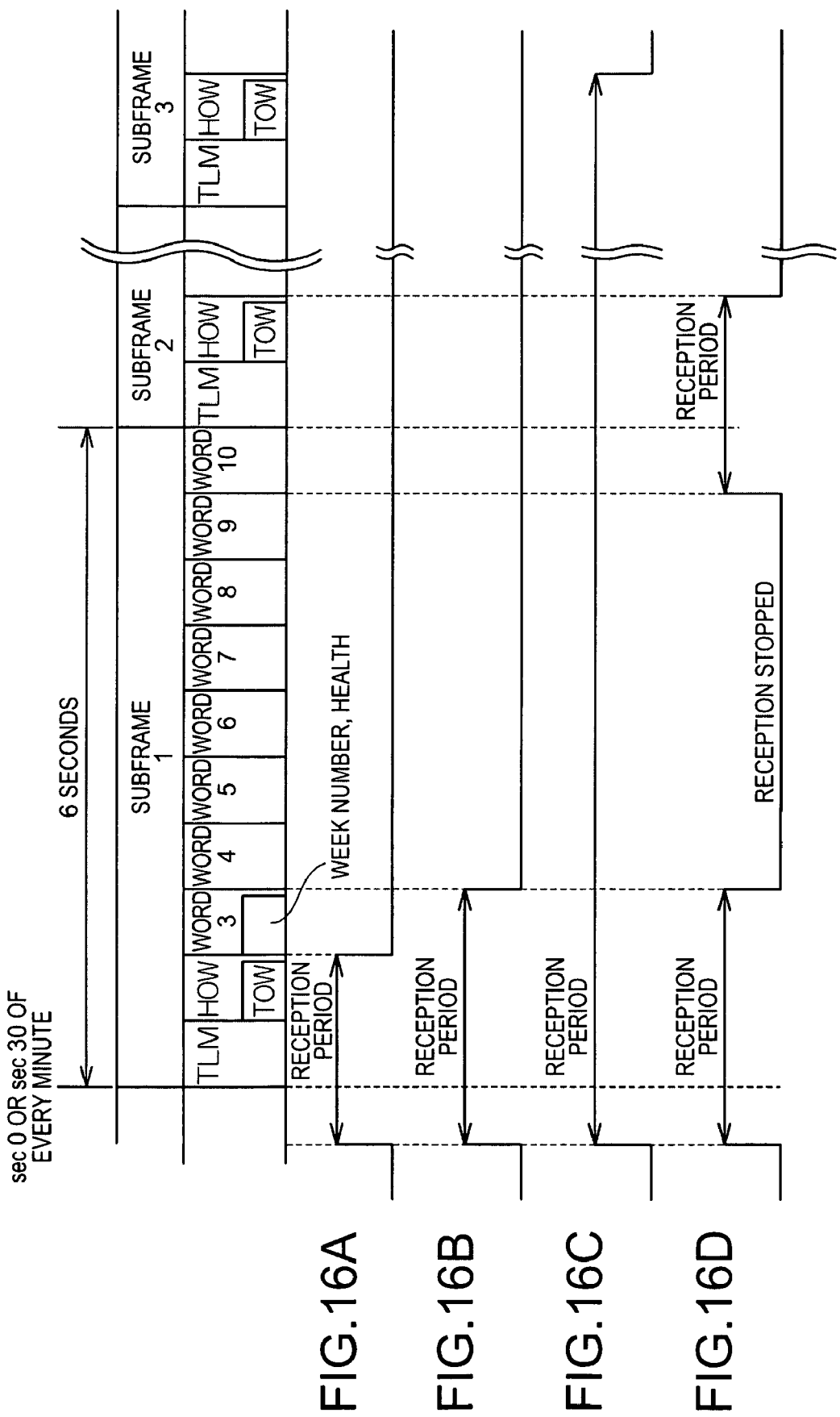
FIGS. 16A-16D show the concept of the reception operation of the wristwatch with a GPS time adjustment device according to the present invention.

In other words, as shown in the timing chart of the reception timing (reception period) in FIG. 16, the reception sequence of operation until the Z count data from subframe 3 is received is shown in line (c).

In this case the GPS device 40 starts the reception operation approximately 10 seconds before the beginning of subframe 1, and continues operating only for the time required to acquire the Z count (TOW) data from subframe 3. The GPS device 40 can therefore reduce power consumption from the reception time in this case because reception is only needed for the approximately 15 second period from the start of subframe 1 until the Z count data is acquired from subframe 3.

In this situation, if the satellite health confirmation program 56 in FIG. 5 determines that the health of the GPS satellite 15 is normal (the GPS satellite 15 is healthy), that is, the satellite health confirmation program 56 determines that there is no problem with the GPS satellite 15 and the range of the match verification threshold value 62*a* is exceeded, it is determined that there is some problem with the Z count data extracted from subframe 1, and the GPS device 40 gets the Z count data from subframe 2 and subframe 3.

Note that the satellite health confirmation program 56 in FIG. 5 is an example of a satellite health evaluation unit. The GPS satellite 15 is an example of a positioning information satellite. The satellite health confirmation program 56 is an example of a health evaluation unit. The match verification threshold value 62*a* in FIG. 6 is an example of the threshold value offset. The Z count data is an example of satellite time information. Subframe 1 is an example of a first subframe information unit. Subframe 2 and subframe 3 are examples of a next subframe information unit.

The data in the reception time data 73*a* in FIG. 7, which is the Z count data from subframes 1, 2, 3, is then compared, and if a match is confirmed between at least two satellite time values, that satellite time information is used to adjust the internal clock.

The time can therefore be reliably adjusted with high precision.

The reception time data 73*a* in FIG. 7 that matches the Z count data in each of subframe 1, subframe 2, and subframe 3 is used in this example. However, if a match is confirmed between the Z count data from subframe 2 and the internal time data 73*b* in FIG. 7 and is within the match verification threshold value 62*a* in FIG. 6, reception can be terminated without acquiring the Z count data for subframe 3. Line (d) in FIG. 16 shows the reception sequence of the reception time (reception period) in this case.

More specifically, the GPS device 40 starts receiving before subframe 1, locates a satellite, receives the satellite signal from the beginning of subframe 1 to the Z count (TOW) data, gets and stores the satellite health data (satellite health, labelled simply "health" in FIG. 16) from word 3 to the satellite health information 72*a* in FIG. 7, inserts a reception pause in which reception stops for a time, resumes reception from before subframe 2, which is the next subframe, and gets the Z count (TOW) data from subframe 2.

In other words, the GPS device 40 of the GPS wristwatch 10 receives subframe 1 and gets the TLM word and the Z count (TOW) data from the HOW word as described above.

As described above, the Z count (TOW) data is the satellite time information, and this Z count data is acquired from the GPS satellite 15.

Therefore, other data, such as the ephemeris and almanac data in FIG. 18A, is not acquired. However, as shown in FIG. 18A the subframes are transmitted sequentially from subframe 1 (A) to subframe 5 (E), and each subframe sequentially carries words from the TLM word to the ephemeris or other last word.

This means that even if the GPS device 40 only needs to acquire the Z count (TOW) data stored in the HOW word of each subframe, the GPS device 40 must continue receiving the satellite data in words 3 to 10 of subframe 1 before getting the Z count (TOW) data from the HOW word in subframe 2 after acquiring the Z count (TOW) data from the HOW word in subframe 1 (A) in FIG. 18A.

The GPS device 40 of the GPS wristwatch 10 must therefore continue signal reception during this time, and power consumption inevitably increases.

To avoid this increase in power consumption, this embodiment of the invention inserts a reception pause that reduces the power supplied from the battery 24 through the regulator 29 for the satellite signal reception operation of the GPS device 40 until the TLM word data in the next subframe (subframe 2 in this case) is transmitted after receiving the HOW word data in subframe 1 and receiving the week number data and satellite health data in word 3. Power consumption by the reception operation of the GPS device 40 can thus be reduced.

Yet more specifically, the GPS device 40 has already synchronized with the C/A code of the GPS satellite 15. This means that the GPS device 40 has synchronized with the starting position of the TLM word in subframe 1. The Z count (TOW) data in the HOW word that is the word following the TLM word can therefore be acquired.

Each subframe lasts 6 seconds and contains 10 words, which means that the reception time for each word is 0.6 second.

The power supplied from the battery 24 through the regulator 29 to the GPS device 40 as shown in FIG. 3 is therefore reduced during a reception pause period after the real-time clock 38 counts 1.2 seconds from the start of the TLM word in subframe 1, but the Z count (TOW) data can be acquired from subframe 1 during this pause.

Because each subframe contains 10 words, the reception pause lasts the 4.8 seconds equal to the time of 8 words. After the reception pause ends, power is again supplied from the battery 24 through the regulator 29 to the GPS device 40 for the next reception period in which the TLM word and Z count (TOW) data of the HOW word are acquired from subframe 2. Another reception pause starts 1.2 seconds later. This enables acquiring the Z count (TOW) data from subframe 1 and subframe 2. Power consumption is also low because a reception pause is inserted. This reception pause period can be determined by the stop reception determination program 57 and reception timing setting program 58 in FIG. 5.

Because there is typically some deviation in the operation of the real-time clock 38 the foregoing periods of 1.2 seconds and 4.8 seconds are set so that reception begins slightly before (FIG. 16 (d)). The reception time (reception period) can also be shortened once the Z count (TOW) data from subframe 3 is acquired, and the Z count (TOW) data can be acquired three times for matching while reducing power consumption.

Control then goes to step ST27, the stop reception determination program 57 in FIG. 5 stops the reception operation of the GPS device 40, and receiving satellite signals from the GPS satellite 15 ends.

Control then goes to step ST28 where the time information adjustment program 502 in FIG. 5 adjusts the internal time data 73b in FIG. 7 based on the reception time data 73a. The reception time data 73a in FIG. 7 that is used in the steps described above is used to correct the time. The time information adjustment program 502 in FIG. 5 saves the corrected time as the time data for timepiece display 73c in FIG. 7.

The adjust display time data program 504 in FIG. 5 then corrects the time displayed by the display 14 and the hands 13 on the dial 12 of the GPS wristwatch 10 based on the time data for timepiece display 73c in FIG. 7.

The GPS wristwatch 10 thus corrects the time as described above.

The real-time clock 38 is an example of a time information generating unit that generates time information. The internal time data 73b is an example of generated time information that is generated by the real-time clock 38, which is an example of a time generating unit. The time data storage unit 73 is an example of a generated time information storage unit. The reception timing determination program 51 is an example of a starting information generating unit. The starting information generating unit is generated based on the generated time information. The generated time information denotes a time before the timing at which the preamble of subframe 1, which is the beginning of the satellite signal transmitted in frame units from a GPS satellite 15, which is an example of a positioning information satellite, is received. The GPS device 40 is an example of a reception unit. Before-starting information is information allowing time for a satellite search and is approximately 10 seconds before the 0 second or 30 second of a predetermined time.

The satellite search program 52 is an example of a starting unit that starts the positioning information satellite search, and the stop reception determination program 57 and reception timing setting program 58 are examples of a stopping unit that stops detecting subframe data, which is a specific unit of the satellite signal.

As a result, the GPS wristwatch 10 can correct the time with the shortest possible signal reception time.

The Z count (TOW) data is an example of satellite time information, which is time information from a positioning information satellite. The time information matching program 501 is an example of an evaluation unit that determines if the satellite time information is correct.

The reception time data 73a is an example of satellite time information, and the time data storage unit 73 is an example of a satellite time information storage unit.

The time information adjustment program 502 (an example of a time adjustment unit) corrects the internal time data 73b (an example of time generation information) based on the reception time data 73a (an example of correct satellite time information) and outputs the result as the time data for timepiece display 73c (an example of corrected display time information).

Because the GPS wristwatch 10 can therefore adjust the time at a predetermined timing independently of device performance, and adjusts the time based on the satellite time information determined to be correct, the correct time can be reliably set.

The time information matching program 501 is an example of a threshold value evaluation unit that determines if the difference, which is the current amount that the time is adjusted, between the internal time data 73b, which is an example of generated time information, and the reception time data 73a, which is an example of satellite time information, exceeds the range of the match verification threshold value 62a. The match verification threshold value 62a is an example of the threshold value offset, which is the offset corresponding to the time passed since the generated time information when the time was last adjusted.

If the time information matching program 501 (an example of a threshold value offset determination unit) is determined to exceed the range of the match verification threshold value 62a (an example of the threshold value offset) the time information adjustment program 502 (an example of a time adjustment unit) does not correct the internal time data (an example of time generation information) based on the reception time data 73a (an example of the current satellite time information).

As a result, if the current satellite time information is not reliable, the time will not be corrected based on that satellite time information, and the offset will therefore not become even greater.

The GPS wristwatch 10 gets the Z count (TOW) data, which is the satellite time information in subframe 1, which is an example of the first subframe information unit in the satellite signal, by means of the stop reception determination program 57 of the GPS device 40 starting reception, the time data acquisition program 53 acquiring the satellite time information from the satellite signal, and the subframe confirmation program 54 verifying the information. The time can therefore be reliably corrected at second 0 and second 30, that is, at a predetermined time, and user convenience is thus improved. Furthermore, the GPS wristwatch 10 receives only the Z count data in subframe 1, and can therefore suppress power consumption.

Furthermore, because a satellite health confirmation program 56, which is an example of a health evaluation unit, determines the condition of the positioning information satellite based on the satellite health information 72a, which is an example of positioning information satellite health information indicating the satellite condition, whether the condition of the positioning information satellite is good or faulty can be determined. As a result, the time will not be corrected using satellite time information from a positioning information satellite determined to be faulty. By acquiring the positioning satellite health information in addition to the Z count data when receiving the time information, it is easier to determine whether the time information is reliable or not. The reception time can also be shortened and power consumption can be reduced when acquiring the positioning satellite health information and Z count data that is the time information because this data is acquired from subframe 1.

Embodiment 2

A GPS wristwatch 10 according to a second embodiment of the invention is substantially identical to the first embodiment described above, like parts are therefore identified by the same reference numerals and the following description focuses on the differences between the embodiments.

More specifically, the GPS wristwatch 10 according to this embodiment of the invention shares the arrangement shown in FIG. 1 to FIG. 4 and FIG. 6 with the first embodiment as described above.

Figure 12:
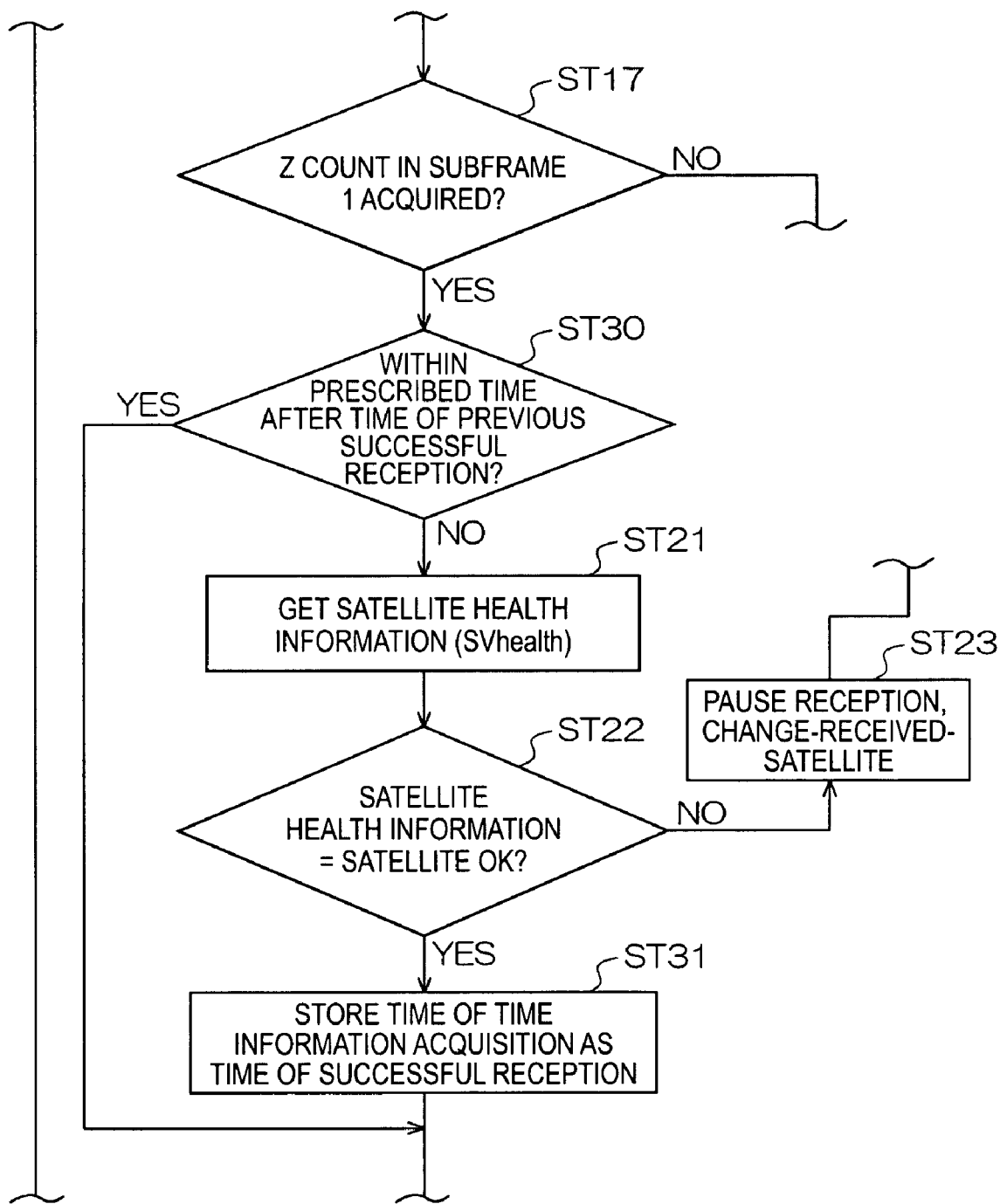
FIG. 12 is a flow chart describing the main steps in the operation of the wristwatch with a GPS time adjustment device according to the second embodiment of the invention.

FIG. 12 is a flow chart describing the operation of the GPS wristwatch 10 according to this second embodiment of the invention. The operation of the GPS wristwatch 10 according to this second embodiment of the invention is substantially the same as the first embodiment, and FIG. 12 therefore shows only the part that differs.

More specifically, the steps before and after the segment shown in FIG. 12 are identical to the steps of the first embodiment. In the flow charts shown in FIG. 8 and FIG. 9, the sequence from the beginning through the reception timing step in ST10 to the step of confirming the Z count data of subframe 1 in step ST17, proceeding to ST18 through step ST20 and looping back to step ST10 if step ST17 returns no, and the steps of adjusting the time and then ending in steps ST21, ST22, and ST24 to ST28 are the same. FIG. 12 is therefore shown omitting part of the process.

The flow chart in FIG. 12 therefore adds steps to the sequence after verifying if the Z count data of subframe 1 was acquired in step ST17.

More specifically, the second embodiment differs from the first embodiment in that a step for confirming the time since the time information was corrected the last time reception was successful is added between step ST17 and step ST21. In addition, a step ST31 of storing the successful reception time is inserted after step ST22 and before step ST24, which is not shown in FIG. 12.

Figure 10:
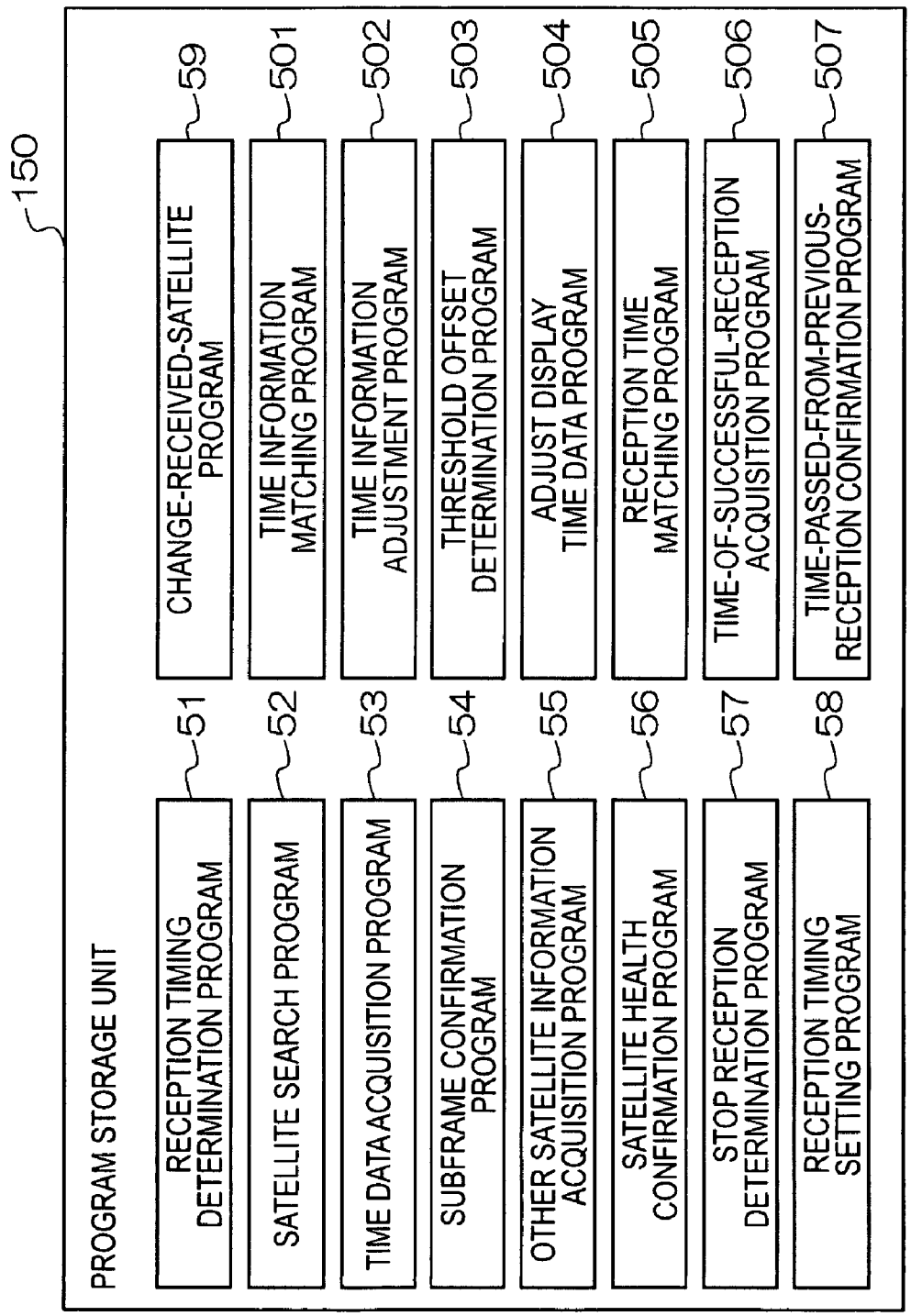
FIG. 10 is a schematic diagram showing the main software configuration of the wristwatch with a GPS time adjustment device according to a second embodiment of the invention.
Figure 11:
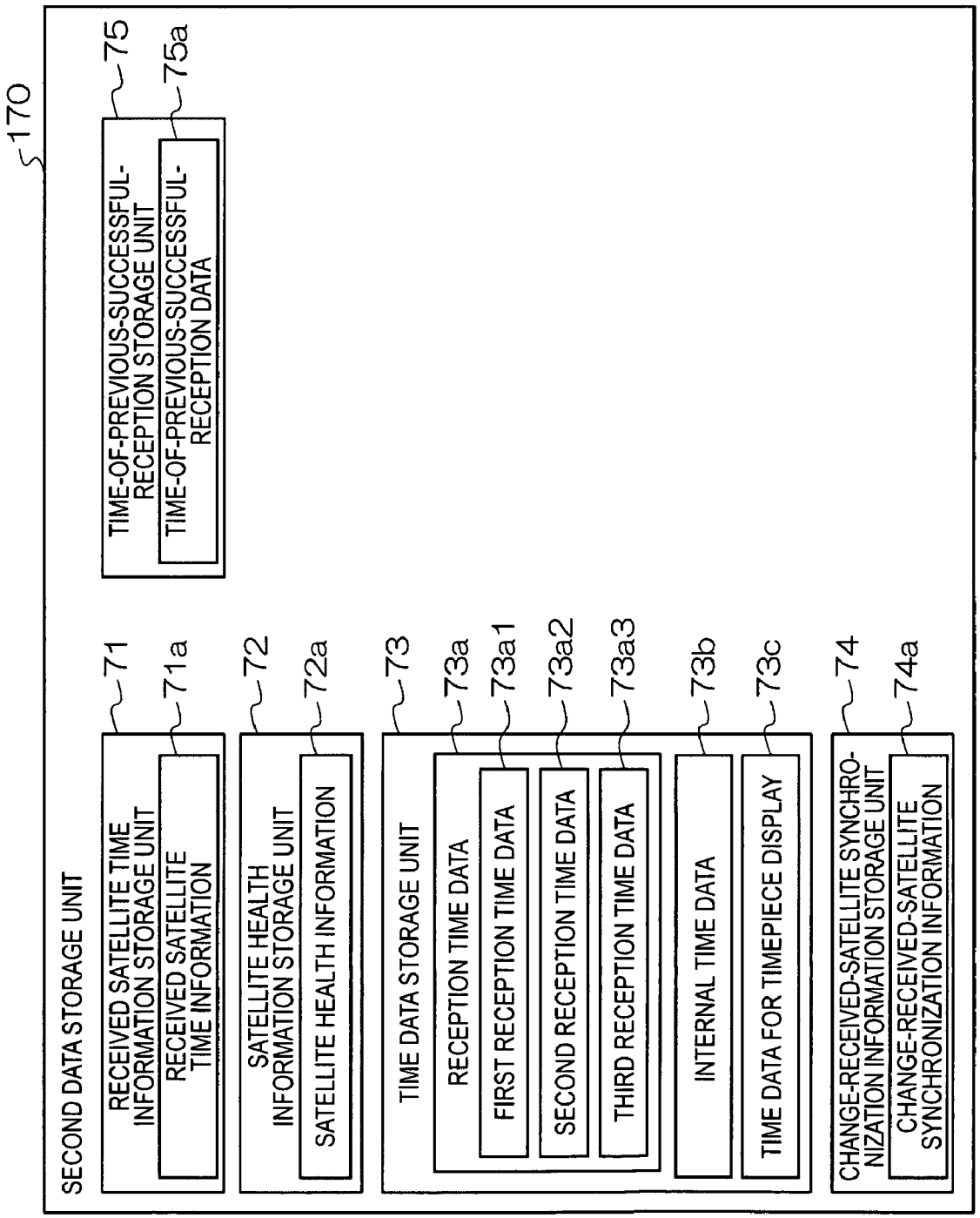
FIG. 11 is a schematic diagram showing the main software configuration of the wristwatch with a GPS time adjustment device according to a second embodiment of the invention.

To accommodate these steps added to the flow chart, additions are also made to the program storage unit and the data storage units shown in FIG. 4 as shown schematically in FIG. 10 and FIG. 11.

FIG. 10 shows the program storage unit 150 and the GPS antenna 11 shows the second data storage unit 170. As described in the first embodiment, the program storage unit 150 and second data storage unit 170 are shown separately simply for convenience describing their function and operation. What differs is the addition of a time-of-successful-reception acquisition program 506 and time-passed-from-previous-reception confirmation program 507 to the program storage unit 150 in FIG. 10, and adding time-of-previous-successful-reception data 75a in a time-of-previous-successful-reception storage unit 75 in the second data storage unit 170 in FIG. 11.

The operation of the GPS wristwatch 10 according to this second embodiment of the invention is described below with reference to FIG. 10, FIG. 11, and the flow chart in FIG. 12 while focusing on the differences with the first embodiment.

As described above, step ST17 determines based on the Z count data acquired from the GPS satellite 15 if it is the Z count data from subframe 1. If the Z count data from subframe 1 is verified, control goes to step ST30 in FIG. 12.

Step ST30 then determines if it is within a predetermined time from the previous successful reception time.

More specifically, the time-passed-from-previous-reception confirmation program 507 in FIG. 10 compares the time passed from the time-of-previous-successful-reception data 75a in FIG. 11 with the internal time data 73b to determine if it is within a predetermined time.

This predetermined time is set to a time when the satellite health information 72a may have been updated or the ephemeris described above is valid, and is set to 4 hours in this example.

That is, if the satellite health information 72a, which is the satellite health information describing the condition of the GPS satellite 15, is changed, the updated status can be known by getting the satellite health information 72a again.

If step ST30 determines that it is within the predetermined time, such as within 4 hours, from the previous successful reception, operation skips without receiving the following data to step ST24 (see FIG. 9) to confirm a match with the internal time information. In this case the satellite health information 72a (see FIG. 11) is considered to have not changed since the previous reception operation, the GPS satellite 15 is considered to be functioning normally, and the time can be adjusted.

That is, the reception time in this case is indicated by the sequence in line (a) in FIG. 16, a timing chart describing the reception time (reception period). FIG. 16 (a) shows that the GPS device 40 starts the reception operation from approximately 10 seconds before the beginning of subframe 1, and operates only for the time required to get the Z count (TOW) data from subframe 1.

If a predetermined time has not passed from the time-of-previous-successful-reception data 75a (see FIG. 11), the GPS wristwatch 10 according to this embodiment of the invention determines that the GPS satellite 15 is healthy based on the satellite health information (SVhealth) 72a acquired the last time the time was corrected. The GPS device 40 is then stopped with only the Z count data from subframe 1. As a result, the reception time is shortened and the GPS wristwatch 10 can further reduce power consumption. Note that the time-of-previous-successful-reception data 75a (see FIG. 11) is the time that the generated time information was last corrected. The GPS satellite 15 is an example of a positioning information satellite. The satellite health information (SVhealth) 72a is an example of positioning information satellite health information. The GPS device 40 is an example of a reception unit. The Z count data is an example of satellite time information.

However, if step ST30 determines that the predetermined time, such as 4 hours, has passed since the internal time data 73b was corrected the last time reception was successful, control goes to step ST21.

In step ST21 the satellite health SVhealth data is acquired as described above in the first embodiment. Control then goes to step ST22 as in the first embodiment to verify the condition of the GPS satellite 15.

If in step ST22 the satellite health information 72a (SVhealth) in FIG. 11, which is the satellite health information, indicates a problem with the satellite, control goes to step ST23 as in the first embodiment.

However, if in step ST22 the satellite health information 72a (SVhealth) in FIG. 11, which is the acquired satellite health information, indicates the satellite is functioning normally, control goes to step ST31.

In step ST31 the time is stored as the successful reception time. More specifically, the time-of-successful-reception acquisition program 506 in FIG. 10 stores the time information from the Z count data acquired from the GPS satellite 15 which the satellite health information 72a (SVhealth) in FIG. 11 indicated is normal as the time-of-previous-successful-reception data 75a in the time-of-previous-successful-reception storage unit 75 in FIG. 11.

The time-of-previous-successful-reception data 75a stored in the time-of-previous-successful-reception storage unit 75 in FIG. 11 is therefore the time when the reception of the satellite signal from the GPS satellite 15 was successful.

Control then goes to step ST24 in FIG. 9 as described in the first embodiment.

The reception time (reception period) in this case is shown by sequence (b) in the reception time (reception period) chart in FIG. 16. FIG. 16(b) shows that the GPS device 40 starts the reception operation from approximately 10 seconds before the beginning of subframe 1, and operates only for the time required to get the data in word 3 after the Z count (TOW) data from subframe 1.

The reception time is therefore next shortest to the reception time of sequence (a) in FIG. 16. Power consumption can therefore be reduced, and the time can be adjusted more accurately using the updated week number data.

More specifically, as described above, the GPS device 40 of the GPS wristwatch 10 according to the second embodiment of the invention additionally has a health evaluation unit that determines the condition of the GPS satellite 15 based on the satellite health information 72a, and is an arrangement for getting the satellite health information 72a when a predetermined time has passed after the time-of-previous-successful-reception data 75a. The GPS device 40 is an example of a reception unit. The GPS satellite 15 is an example of a positioning information satellite. The satellite health information 72a is an example of a positioning information satellite health information.

As a result, if the condition of the GPS satellite 15 has changed since the previous signal reception, the time can be adjusted according to the condition of the satellite. If it is determined that there is a problem with the GPS satellite 15 the Z count from the GPS satellite 15 is not used to adjust the time. As a result, the time will not be adjusted based on the Z count from an unhealthy GPS satellite 15. The subsequent steps are the same as described in the first embodiment above. The GPS satellite 15 is an example of a positioning information satellite. The Z count is an example of satellite time information from a positioning information satellite.

Embodiment 3

A GPS wristwatch 10 according to a third embodiment of the invention is substantially identical to the first embodiment described above, like parts are therefore identified by the same reference numerals and the following description focuses on the differences between the embodiments.

More specifically, the GPS wristwatch 10 according to this embodiment of the invention shares the arrangement shown in FIG. 1 to FIG. 4 and FIG. 6 with the first embodiment as described above.

Figure 15:
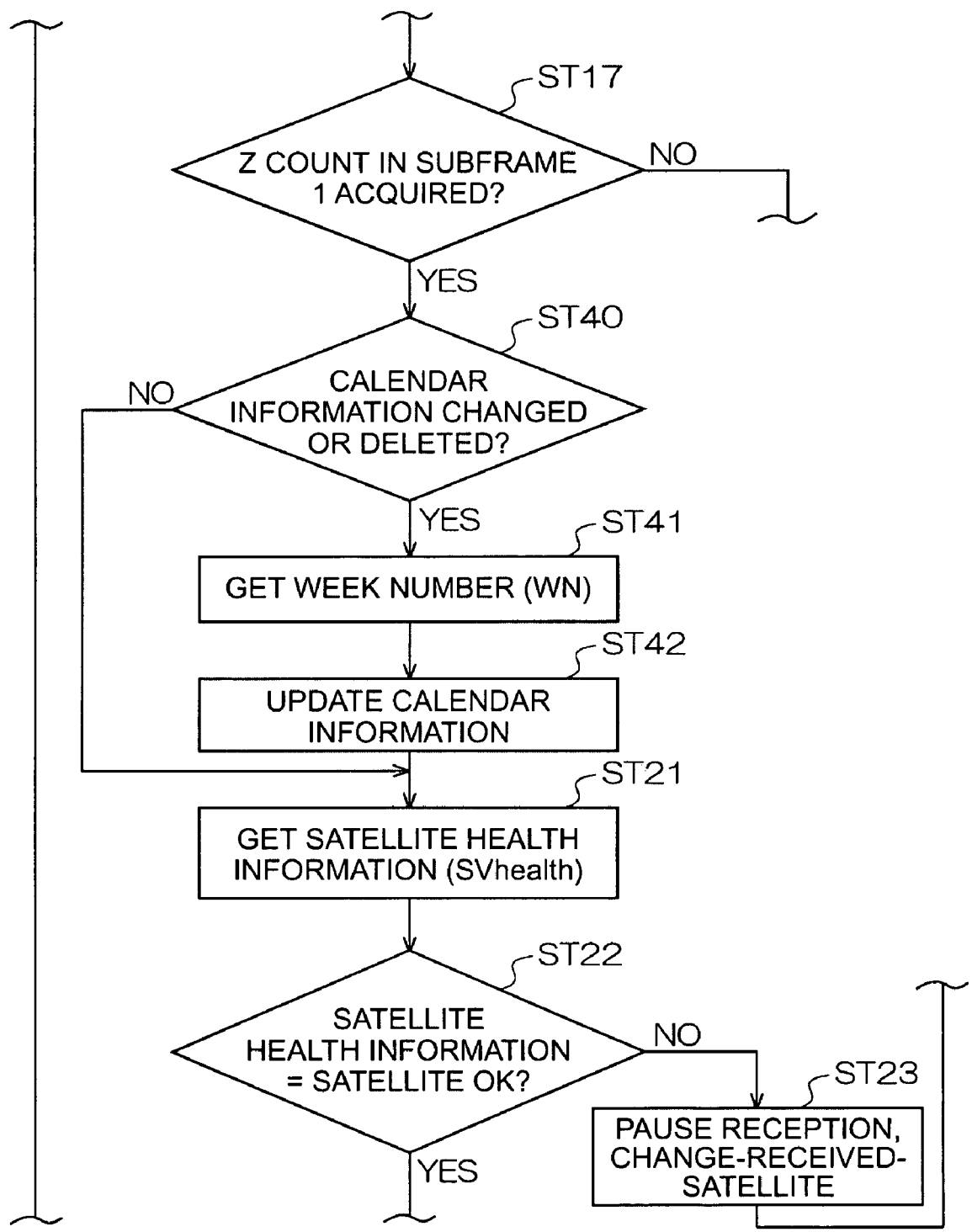
FIG. 15 is a flow chart describing the main steps in the operation of the wristwatch with a GPS time adjustment device according to the third embodiment of the invention.

FIG. 15 is a flow chart describing the operation of the GPS wristwatch 10 according to this third embodiment of the invention. The operation of the GPS wristwatch 10 according to this third embodiment of the invention is substantially the same as the first embodiment, and FIG. 15 therefore shows only the part that differs.

More specifically, the steps before and after the segment shown in FIG. 15 are identical to the steps of the first embodiment. In the flow charts shown in FIG. 8 and FIG. 9, the sequence from the beginning through the reception timing step in ST10 to the step of confirming the Z count data of subframe 1 in step ST17, proceeding to ST18 through step ST20 and looping back to step ST10 if step ST17 returns no, and the steps of adjusting the time and then ending in steps ST21 to ST28 are the same. FIG. 15 is therefore shown omitting part of the process.

The flow chart in FIG. 12 therefore adds steps to the sequence after verifying if the Z count data of subframe 1 was acquired in step ST17.

More specifically, the third embodiment differs from the first embodiment in that a step of confirming if the calendar information of the GPS wristwatch 10 has changed or been deleted, a step of acquiring the week number data, and a step of updating the calendar information, are added between step ST17 and step ST21.

Figure 13:
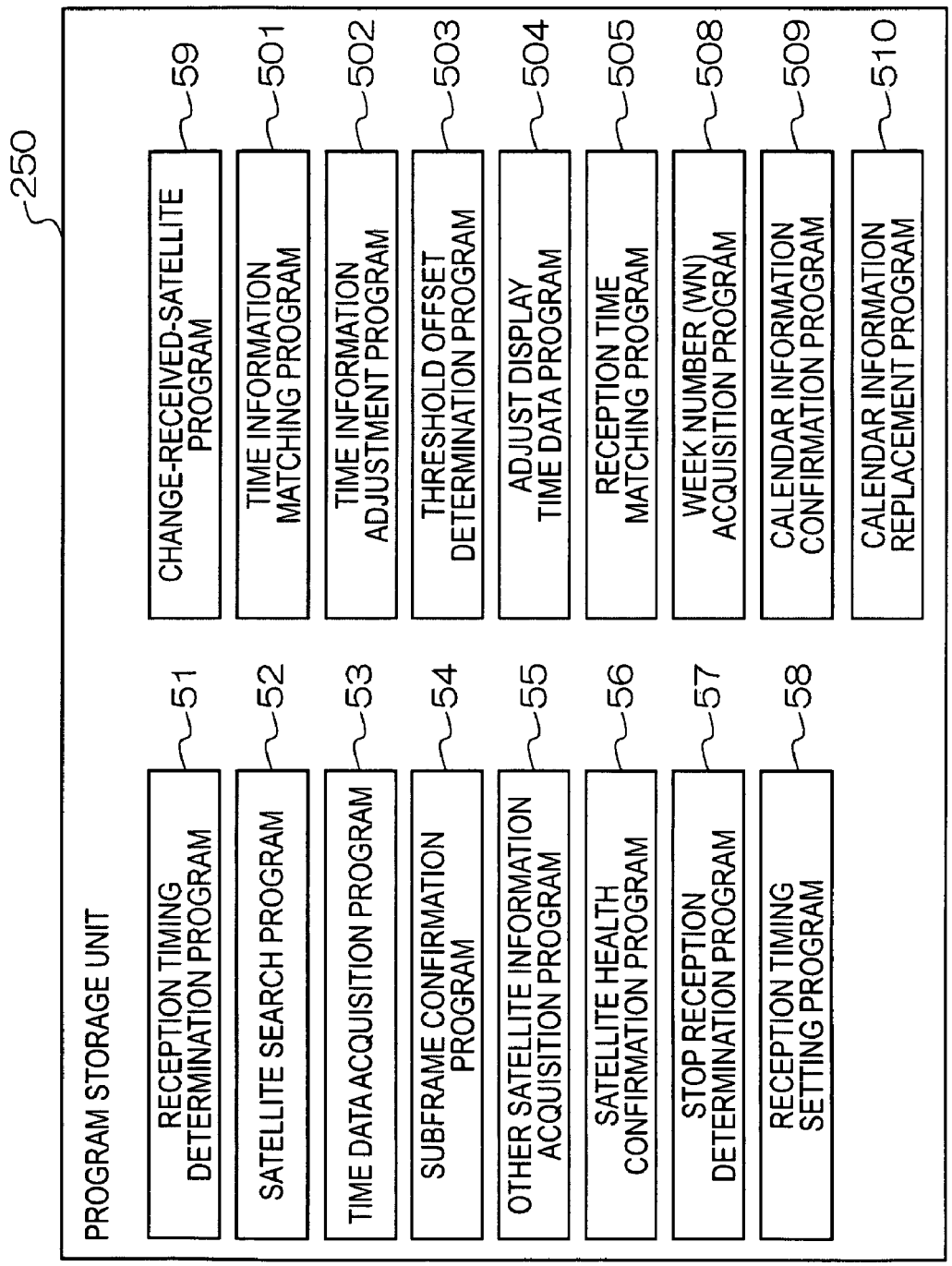
FIG. 13 is a schematic diagram showing the main software configuration of the wristwatch with a GPS time adjustment device according to a third embodiment of the invention.
Figure 14:
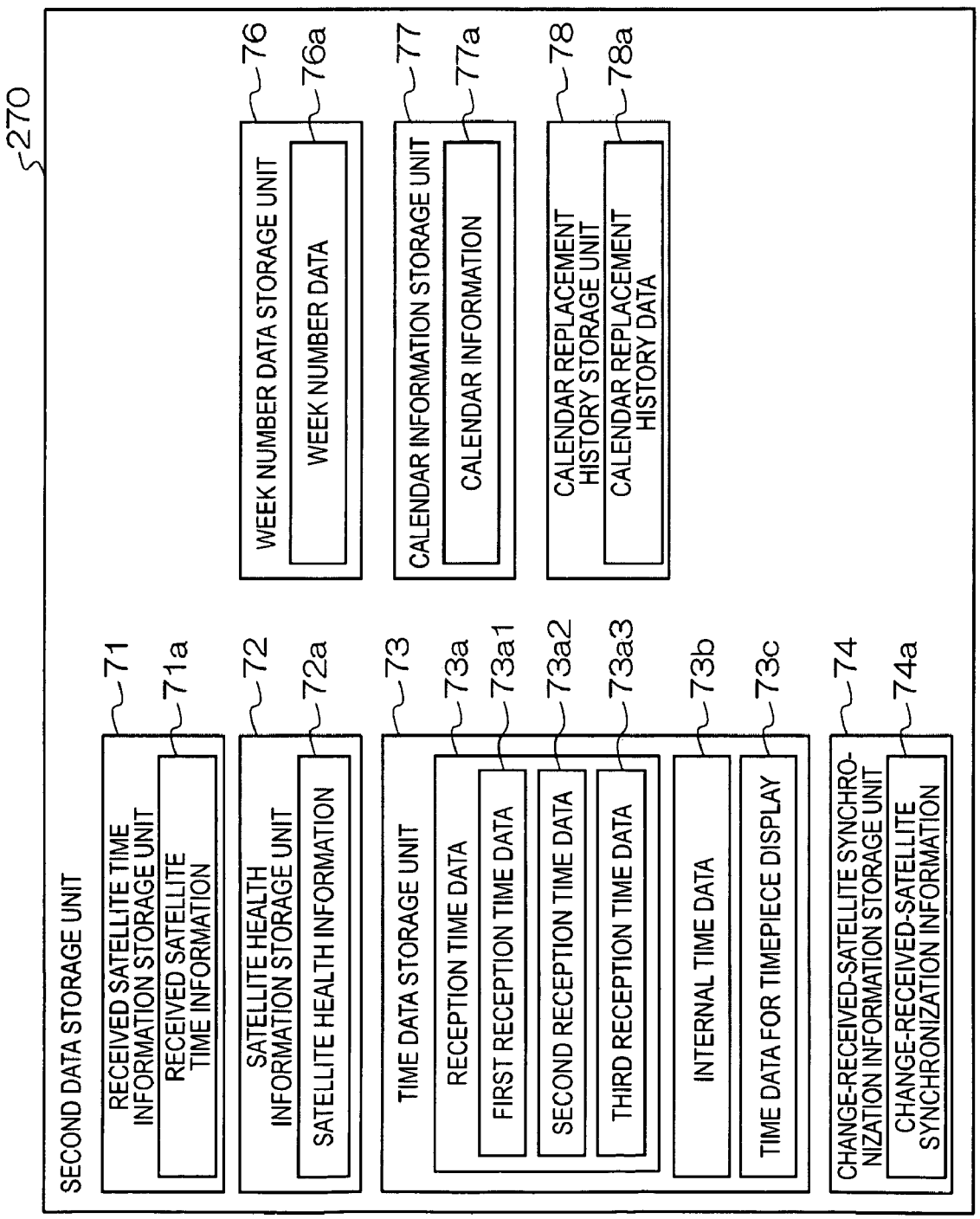
FIG. 14 is a schematic diagram showing the main software configuration of the wristwatch with a GPS time adjustment device according to a third embodiment of the invention.

To accommodate these steps added to the flow chart, additions are also made to the program storage unit and the data storage units shown in FIG. 4 as shown schematically in FIG. 13 and FIG. 14.

FIG. 13 shows the program storage unit 250, and FIG. 14 shows the second data storage unit 270. As described in the first embodiment, the program storage unit 250 and second data storage unit 270 are shown separately simply for convenience describing their function and operation. What differs is the addition of a week number acquisition program 508, a calendar information confirmation program 509, and a calendar information replacement program 510 to the program storage unit 250 in FIG. 13, and the addition of week number data 76a in a week number data storage unit 76, calendar information 77a in a calendar information storage unit 77, and calendar replacement history data 78a in a calendar replacement history storage unit 78 in the second data storage unit 270 shown in FIG. 14.

The operation of the GPS wristwatch 10 according to this third embodiment of the invention is described below with reference to FIG. 13, FIG. 14, and the flow chart in FIG. 15 while focusing on the differences with the first embodiment.

As described above, step ST17 determines based on the Z count data acquired from the GPS satellite 15 if it is the Z count data from subframe 1. If the Z count data from subframe 1 is verified, control goes to step ST40 in FIG. 15.

Whether the calendar information was changed or deleted is then determined in step ST40.

More specifically, the calendar information confirmation program 509 in FIG. 13 checks the calendar replacement history data 78a in the calendar replacement history storage unit 78 in FIG. 14, and determines if the calendar information 77a in the calendar information storage unit 77 has changed or been deleted.

The calendar replacement history data 78a in the calendar replacement history storage unit 78 records information about the calendar information 77a being changed and information about the calendar information 77a in the calendar information storage unit 77 being reset as a result of the user operating a button, for example.

In such cases the GPS wristwatch 10 must update and correct the calendar information 77a.

If step ST40 detects a change, control goes to step ST41.

In step ST41 the GPS device 40 acquires the week number (WN) data after getting the Z count of subframe 1 in the navigation message that is the satellite signal from the GPS satellite 15.

More specifically, the week number (WN) acquisition program 508 in FIG. 13 gets the week number (WN) data from word 3 following the Z count of subframe 1 in the navigation message that is the satellite signal from the GPS satellite 15, and stores it as the week number data 76a in the week number data storage unit 76 in FIG. 14. As described above, because the week number (WN) data in the navigation message that is the satellite signal is contained in word 3 of subframe 1, the stop reception determination program 57 in FIG. 13 decides to keep the GPS device 40 operating until this word 3 is received. The week number (WN) acquisition program 508 in FIG. 13 then gets the week number (WN) data from the received word 3, and stores the week number (WN) as the week number data 76a in the week number data storage unit 76 in FIG. 14.

Then in step ST42 the calendar information replacement program 510 in FIG. 13 updates the calendar information 77a in the calendar information storage unit 77 in FIG. 14 based on the week number data 76a in FIG. 14.

However, if step ST40 determines there was no change, control goes to step ST21. This step is the same as described in the first embodiment, and further description is omitted here. Operation from step ST21 is identical to the first embodiment.

Week number data 76a (as an example of the week number information (WN)) that is a continuous count since the origin of the satellite time information is therefore contained in subframe 1 (as an example of a first subframe unit). If the calendar information 77a (as an example of calendar information) has changed, the GPS device 40 (as an example of a reception unit) acquires the week number data 76a (as an example of week number information), and the calendar information 77a (as an example of calendar information) is adjusted by the calendar information replacement program 510 based on the week number data 76a (as an example of the week number information (WN)).

As a result, if the calendar information 77a of the GPS wristwatch 10 is changed or reset by the user, the week number data 76a can be acquired and the calendar information 77a can be corrected, thereby improving user convenience.

The invention is not limited to the embodiments described above. The foregoing embodiments are described with reference to a GPS satellite, but the invention is not limited to GPS satellites can be used with Global Navigation Satellite Systems (GNSS) such as Galileo and GLONASS, and other positioning information satellites that transmit satellite signals containing time information, including the SBAS and other geostationary or quasi-zenith satellite.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A time adjustment device comprising:
    a reception unit that receives a satellite signal transmitted from a positioning information satellite;
    a time information generating unit that generates time information;
    a generated time information storage unit that stores the time information generated by the time information generating unit as generated time information; and
    a starting information generating unit that generates information before the beginning of a specific unit of the satellite signal that is transmitted in specific units from the positioning information satellite as before-starting information based on the generated time information;
    wherein the reception unit has
        a starting unit that starts searching for the positioning information satellite at a predetermined timing based on the before-starting information, and
        a stopping unit that detects the specific unit of the satellite signal and stops searching for the positioning information satellite; and
        the generated time information is corrected at the timing when the reception unit stops; and wherein
    the specific unit of the satellite signal is a frame information unit wherein multiple subframe information units containing at least the satellite time information constitute one frame information unit;
    the reception unit receives the satellite time information in the first subframe information unit;
    the first subframe information unit contains positioning information satellite health information denoting the condition of the positioning information satellite;
    the reception unit acquires the positioning information satellite health information when a specific time has passed since the last time the generated time information was corrected; and
    the time adjustment device further comprises a health evaluation unit that determines the condition of the positioning information satellite based on the positioning information satellite health information.

2. The time adjustment device described in claim 1, wherein:
    the specific unit of the satellite signal includes satellite time information that is time information from the positioning information satellite;
    the reception unit includes a decision unit that acquires the satellite time information and determines if the satellite time information is correct; and
    the time adjustment device further comprises:
        a satellite time information storage unit that stores the satellite time information determined by the decision unit to be correct as correct satellite time information; and
        a time adjustment unit that produces corrected display time information by correcting the generated time information based on the correct satellite time information.

3. The time adjustment device described in claim 2, further comprising:
    a threshold value offset evaluation unit that determines if the difference, which is the current time adjustment amount, between the generated time information and the satellite time information is outside the range of a threshold value offset, which is a time offset corresponding to the time passed since the generated time information when the time was last adjusted;
    wherein the time adjustment unit does not adjust the generated time information based on the current satellite time information if the threshold value offset evaluation unit determines that said difference is outside the threshold value offset range.

4. The time adjustment device described in claim 1, wherein:

the before-starting information generated by the starting information generating unit is rendered so that the generated time information is corrected at either second 0 or second 30 or a minute when the generated time information is corrected.

5. The time adjustment device described in claim 1, wherein:
when the health evaluation unit determines that the positioning information satellite is operating normally based on the positioning information satellite health information,
the reception unit additionally acquires the satellite time information in the next subframe information unit of the satellite signal if the threshold value offset evaluation unit determines the threshold value offset range is exceeded;
the time adjustment device further comprises a satellite time information storage unit that stores the satellite time information from the subframe information units as satellite time information data; and
the time adjustment unit is an arrangement that adjusts the generated time information using the satellite time information data from one of at least two subframe information units of which the satellite time information data is within the offset between the subframe information units of the satellite signal.

6. The time adjustment device described in claim 5, wherein the reception unit receives signals from another positioning information satellite when the health evaluation unit determines the positioning information satellite is not healthy based on the positioning information satellite health information.

7. The time adjustment device described in claim 6, wherein:
the first subframe information unit includes week number information, which is the number of weeks since the origin of the satellite time information;
calendar information is contained in the internal time counter of the time information generating unit that generates the time information of the time adjustment device,
the reception unit acquires the week number information when the calendar information changes, and
the calendar information is adjusted based on the week number information.

8. A timekeeping device with a time adjustment device comprising:
a reception unit that receives a satellite signal transmitted from a positioning information satellite;
a time information generating unit that generates time information;
a generated time information storage unit that stores the time information generated by the time information generating unit as generated time information; and
a starting information generating unit that generates information before the beginning of a specific unit of the satellite signal that is transmitted in specific units from the positioning information satellite as before-starting information based on the generated time information;
wherein the reception unit has
a starting unit that starts searching for the positioning information satellite at a predetermined timing based on the before-starting information, and
a stopping unit that detects the specific unit of the satellite signal and stops searching for the positioning information satellite; and
the generated time information is corrected at the timing when the reception unit stops; and wherein
the specific unit of the satellite signal is a frame information unit wherein multiple subframe information units containing at least the satellite time information constitute one frame information unit;
the reception unit receives the satellite time information in the first subframe information unit;
the first subframe information unit contains positioning information satellite health information denoting the condition of the positioning information satellite;
the reception unit acquires the positioning information satellite health information when a specific time has passed since the last time the generated time information was corrected; and
the time adjustment device further comprises a health evaluation unit that determines the condition of the positioning information satellite based on the positioning information satellite health information.

9. A time adjustment method comprising:
a time information generating step of generating time information;
a generated time information storage step of storing the time information generated by the time information generating step as generated time information;
a starting information generating step of generating information before the beginning of a specific unit of the satellite signal that is transmitted in specific units from a positioning information satellite as before-starting information based on the generated time information;
a reception step including a starting step that starts searching for a positioning information satellite at a predetermined timing based on the before starting information, and
a stopping step that detects the specific unit of the satellite signal and stops searching for the positioning information satellite; and
a step of correcting the generated time information at the timing when the stopping step of the reception step stops reception; and wherein
the specific unit of the satellite signal is a frame information unit wherein multiple subframe information units containing at least the satellite time information constitute one frame information unit; and comprising
receiving the satellite time information in the first subframe information unit; and wherein
the first subframe information unit contains positioning information satellite health information denoting the condition of the positioning information satellite; and comprising
acquiring the positioning information satellite health information when a specific time has passed since the last time the generated time information was corrected; and
determining the condition of the positioning information satellite based on the positioning information satellite health information.

* * * * *

UNITED STATES PATENT AND TRADEMARK OFFICE
CERTIFICATE OF CORRECTION

| | | |
|---|---|---|
| PATENT NO. | : 7,701,390 B2 | Page 1 of 1 |
| APPLICATION NO. | : 12/128472 | |
| DATED | : April 20, 2010 | |
| INVENTOR(S) | : Teruhiko Fujisawa | |

It is certified that error appears in the above-identified patent and that said Letters Patent is hereby corrected as shown below:

Column 26,
Line 36, please change "before starting" to --before-starting--

Signed and Sealed this

Eighth Day of June, 2010

David J. Kappos
*Director of the United States Patent and Trademark Office*